(12) United States Patent
Hill et al.

(10) Patent No.: US 9,634,529 B2
(45) Date of Patent: Apr. 25, 2017

(54) ELECTRICAL MACHINE

(71) Applicant: Fisher & Paykel Appliances Ltd., East Tamaki, Auckland (NZ)

(72) Inventors: Gregory P. Hill, Auckland (NZ); John Julian A. Williams, Auckland (NZ); Gerald D. Duncan, Auckland (NZ); Kerrin E. Burnnand, Auckland (NZ); Mark G. Benson, Auckland (NZ)

(73) Assignee: Fisher & Paykel Appliances Ltd., Auckland (NZ)

( * ) Notice: Subject to any disclaimer, the term of this patent is extended or adjusted under 35 U.S.C. 154(b) by 1013 days.

(21) Appl. No.: 13/693,890

(22) Filed: Dec. 4, 2012

(65) Prior Publication Data

US 2013/0214637 A1    Aug. 22, 2013

Related U.S. Application Data

(60) Provisional application No. 61/630,252, filed on Dec. 5, 2011, provisional application No. 61/635,719, filed on Apr. 19, 2012.

(51) Int. Cl.
| | |
|---|---|
| *H02K 1/14* | (2006.01) |
| *H02K 1/12* | (2006.01) |
| *H02K 1/18* | (2006.01) |
| *H02K 3/52* | (2006.01) |

(52) U.S. Cl.
CPC ............... *H02K 1/12* (2013.01); *H02K 1/146* (2013.01); *H02K 1/187* (2013.01); *H02K 3/522* (2013.01)

(58) Field of Classification Search
CPC ........ H02K 1/146; H02K 1/187; H02K 1/165; H02K 23/405
See application file for complete search history.

(56) References Cited

U.S. PATENT DOCUMENTS

| | | | | |
|---|---|---|---|---|
| 5,604,389 | A * | 2/1997 | Nitta | H02K 1/146 310/209 |
| 2006/0091758 | A1 * | 5/2006 | Ahn | D06F 37/304 310/216.001 |
| 2009/0026873 | A1 * | 1/2009 | Matsuo | H02K 15/022 310/216.009 |
| 2010/0295405 | A1 * | 11/2010 | Shikata | H02K 1/148 310/195 |

* cited by examiner

*Primary Examiner* — Terrance Kenerly
(74) *Attorney, Agent, or Firm* — Knobbe Martens Olson & Bear LLP

(57) ABSTRACT

A method of making generally symmetrical lamination stacks for electrical machines comprises producing generally symmetrical pole tips from alternating asymmetrical pieces that each have an additional layer in the asymmetrical portion. With the alternating asymmetrical pieces combined, the resulting pole tip is generally symmetrical with a larger possible pole tip width compared with currently-used interleaved stamping techniques.

17 Claims, 20 Drawing Sheets

ELECTRICAL MACHINE

CROSS-REFERENCE TO RELATED APPLICATIONS

This application claims the priority benefit of U.S. Provisional Application No. 61/630,252, filed on Dec. 5, 2011 and U.S. Provisional Application No. 61/635,719, filed on Apr. 19, 2012, each of which is hereby incorporated by reference in its entirety.

BACKGROUND OF THE INVENTION

Field of the Invention

The present invention generally relates to electrical machines and related appliances. More particularly, certain features, aspects and advantages of the present invention relate to motors as made and used for applications such as washing machines and the like.

Description of the Related Art

Manufacturers of washing machines and other appliances are under constant pressure to reduce costs relating to their products. One way in which manufactures can reduce costs is by creating modular assemblies that can be used on a variety of different products. Thus, there is a desire to increase the use of modular assembles. Particular attention also is being paid to decreasing the cost of materials by designing products to more efficiently use raw materials. Finally, pressures exist to improve performance as well as energy efficiency. These pressures also exist in other industries that use electric motors or related electric machines, such as generators, for example.

SUMMARY OF THE INVENTION

Accordingly, certain features, aspects and advantages of the present invention provide an electrical machine that will provide the public with a useful choice. In addition, certain features, aspects and advantages of the present invention will go some way toward improving the efficiency or reducing the cost of electric motors and/or appliances using the motors.

In some configurations, a lamination stack for an electrical machine is constructed from multiple sheet metal profiles that are interleaved. The metal profiles comprise asymmetrical pole tip profiles. The asymmetrical pole tip profiles comprise a pole extension on a first side of a pole body and a void on a second side of the pole body. The pole extension is provided with a double thickness prior to helical winding.

In some configurations, the multiple stamped sheet metal profiles are interleaved in a helically wound spiral stack.

In some configurations, the void on the second side of the pole body extends a full length of the pole extension on the first side of the pole body such that an entire pole extension is omitted from the second side of the pole body.

In some configurations, the asymmetrical pole tip comprises a main pole extension and an auxiliary portion.

In some configurations, prior to folding, the main pole extension and the auxiliary pole portion are connected at a fold line and, after folding, the main pole extension and the auxiliary pole portion combine to form the double thickness.

In some configurations, the main pole extension, the auxiliary pole extension and the fold line are sized and configured to allow the positioning of the folded tip feature in a position with an edge surface of the auxiliary pole extension substantially aligned with the main pole extension after folding.

In some configurations, the double thickness pole extension of a first pole supports the double thickness pole extension of a third pole and a second pole body being positioned between a pole body of the first pole and a pole body of the third pole.

In some configurations, a first of the two stamped profiles nests with a second of the two stamped profiles to provide a generally symmetrical profile prior to winding.

In some configurations, a pole tip width, as assembled, is wider than the pole stem by as much as the interleaving process will allow or as little as the design requires.

In some configurations, a pole body length is up to ten times a pole tip width in the assembled lamination stack.

In some configurations, the metal stampings comprise a spine undercut, the spine undercut being as much as 90% of a yoke width.

In some configurations, the undercut produces an opening to facilitate bend forming of the lamination stack around a former or to a patterned shape.

In some configurations, the undercut has a depth that allows the flux transfer through the lamination stack.

In some configurations, a lamination stack for an electrical machine includes a plurality of extending pole cores each including multiple layers of sheet metal. The stack is constructed from multiple sheet metal profiles. The metal profiles comprise one or more asymmetrical pole tip profile. The asymmetrical pole tip profiles comprise a pole extension on a first side of a pole body. The pole extensions are provided with a double thickness portion. In an extending pole core, each layer of sheet material comprises a pole body and a pole extension of a first one of the sheet metal profiles and at least part of the double thickness portion of the pole extension of an adjacent profile.

In some configurations, the multiple sheet metal profiles are interleaved in a helically wound spiral stack.

In some configurations, the asymmetrical pole tip comprises a main pole extension and an auxiliary portion.

In some configurations, prior to folding, the main pole extension and the auxiliary pole portion are connected at a fold line and, after folding, the main pole extension and the auxiliary pole portion combine to form the double thickness.

In some configurations, the main pole extension, the auxiliary pole extension and the fold line are sized and configured to allow the positioning of the folded tip feature in a position with an edge surface of the auxiliary pole extension substantially aligned with the main pole extension after folding.

In some configurations, the double thickness pole extension of a first pole supports the double thickness pole extension of a third pole and a second pole body is positioned between a pole body of the first pole and a pole body of the third pole.

In some configurations, a first of the two profiles nests with a second of the two profiles to provide a generally symmetrical profile prior to winding.

In some configurations, a pole tip width, as assembled, is wider than the pole stem by as much as the interleaving process will allow or as little as the design requires.

In some configurations, a pole body length is up to ten times a pole tip width in the assembled lamination stack.

In some configurations, the metal profiles comprise a spine undercut with the spine undercut being as much as about 90% of a yoke width.

In some configurations, the undercut produces an opening to facilitate bend forming of the lamination stack around a former or to a patterned shape.

In some configurations, the undercut has a depth that allows flux transfer through the lamination stack.

In some configurations, a lamination stack includes a plurality of extending poles each including multiple layers of sheet metal. The stack is constructed from multiple sheet metal profiles that are interleaved in a helically-wound spiral stack.

In some configurations, multiple sheet metal profiles are not the same and, within each extending pole, the form of adjacent sheet metal profiles are substantially different but in combination have a pole body and pole extensions on either side of the pole body.

In some configurations, each profile comprises asymmetrical pole tip profiles comprising a first lateral profile at a first side of a tip region of a pole body and a second lateral profile at a second side of the tip region of the pole body. The first and second lateral profiles are dissimilar such that the lateral profiles are not symmetric across a centerline of the pole body.

In some configurations, the asymmetrical pole tip includes a region provided with a double thickness.

In some configurations, the first lateral profile of the asymmetrical pole tip comprises a main pole extension and an auxiliary portion.

In some configurations, prior to folding, the main pole extension and the auxiliary pole portion are connected at a fold line and, after folding, the main pole extension and the auxiliary pole portion combine to form a double thickness.

In some configurations, the main pole extension, the auxiliary pole extension and the fold line are sized and configured to allow the positioning of the folded tip feature in a position with an edge surface of the auxiliary pole extension substantially aligned with the main pole extension after folding.

In some configurations, the double thickness pole extension of a first pole of a profile supports the double thickness pole extension of a third pole of a profile and a second pole body of a profile being positioned between a pole body of the first pole of a profile and a pole body of the third pole of a profile.

In some configurations, a first of the two profiles nests with a second of the two profiles to provide a generally symmetrical profile prior to winding.

In some configurations, a pole tip width, as assembled, is wider than the pole stem by as much as the interleaving process will allow or as little as the design requires.

In some configurations, a pole body length is up to ten times a pole tip width in the assembled lamination stack.

In some configurations, the metal profiles comprise a spine undercut with the spine undercut being as much as about 90% of a yoke width.

In some configurations, the undercut produces an opening to facilitate bend forming of the lamination stack around a former or to a patterned shape.

In some configurations, the undercut has a depth that allows flux transfer through the lamination stack.

In some configurations, a yoke forms a closed path and a plurality of pole cores extend radially outwardly from the yoke.

In some configurations, pole cores extend radially outwardly from the yoke.

In some configurations, there are between about 20 and about 50 pole cores extending from the yoke.

In some configurations, the stack has a thickness of between about 8 mm and about 80 mm in a direction normal to a planar orientation of the profiles.

In some configurations, the stack of profiles has a largest dimension parallel with a planar orientation of the profiles of greater than 150 mm.

In some configurations, the stack of profiles has a largest dimension parallel with a planar orientation of the profiles of greater than 180 mm and less than 400 mm.

In some configurations, the lamination stack defines a yoke following a closed path and a plurality of radially outwardly extending pole cores. Electrical insulation can cover at least parts of the pole cores and at least one conductor can be arranged in coils around multiple of the insulated pole cores.

In some configurations, an electrical machine comprises a stator including a lamination stack as described above and a rotor.

In some configurations, a washing appliance includes a wash drum mounted to rotate within a generally stationary tub and a motor connected to directly rotate the drum. The motor comprises a rotor secured to a driveshaft and a stator as described above that is secured to a secondary surface of the tub.

The lamination stack developments described herein relate to electrical machines in general, including motors and generators. Lamination stacks incorporating the developments may be used to advantage in stators and in some rotors, as well as in outside rotor machines and in some inside rotor machines. While not necessarily so limited, the embodiments described herein relate to an outside rotor electric motor for application to laundry appliances. Some advantages set forth may only apply in such an application.

Any of the motor stators and the motor stator stacks described herein can be combined. Various features from various described embodiments can be used together in combinations not shown or explicitly described and such combinations are contemplated.

BRIEF DESCRIPTION OF THE DRAWINGS

These and other features, aspects and advantages of the present invention will now be described with reference to the drawings of preferred embodiments, which embodiments are intended to illustrate and not to limit the invention, and in which figures.

DETAILED DESCRIPTION OF THE PREFERRED EMBODIMENT

Figure 1:
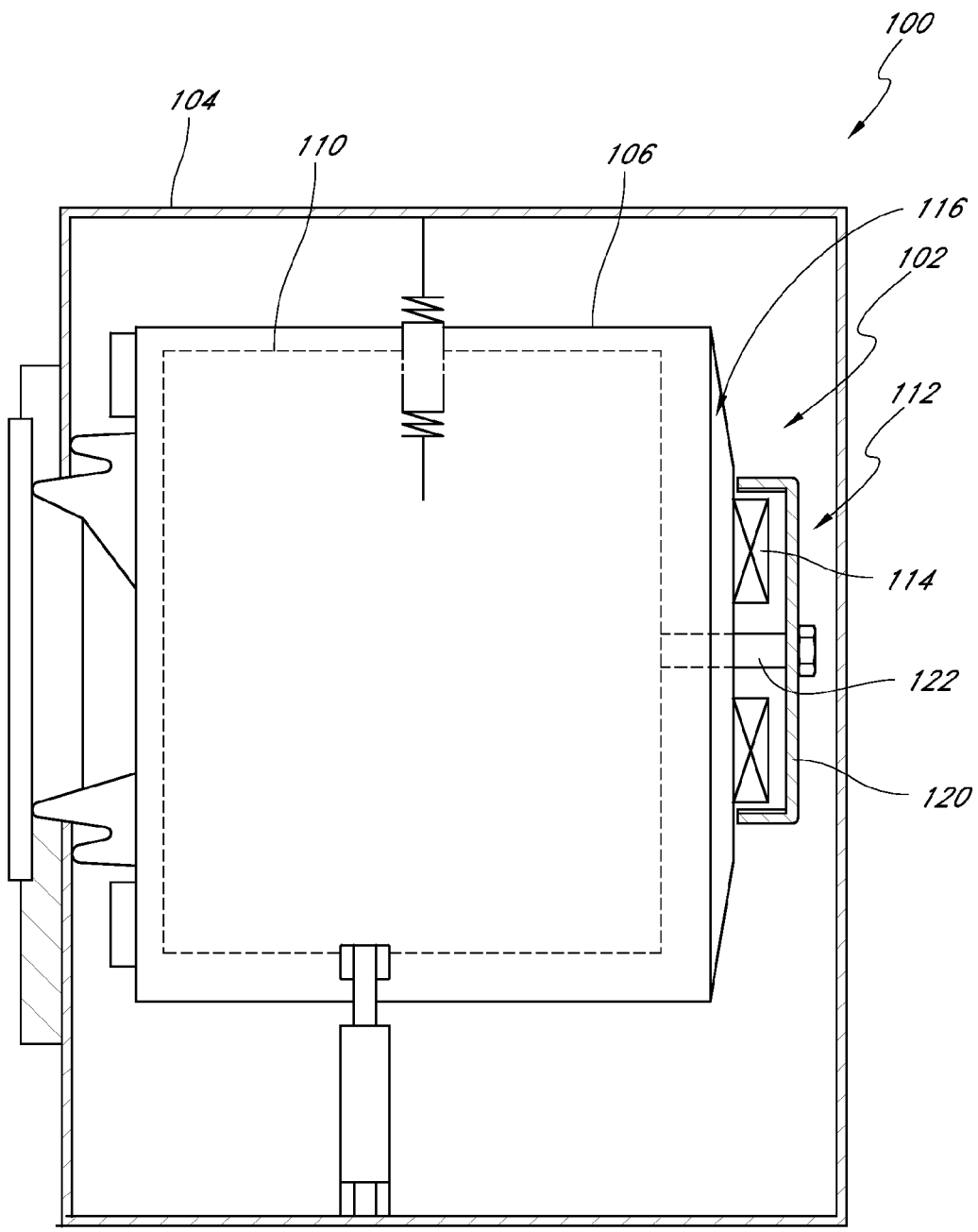
FIG. 1 is a schematic side elevation view of a washing machine having a motor that is arranged and configured in accordance with certain features, aspects and advantages of the present invention.

With reference initially to FIG. 1, certain features, aspects and advantages of the present invention relate to a washing machine 100 that comprises a direct drive assembly 102. While the illustrated washing machine 100 comprises a front-loading washing machine, certain features, aspects and advantages of the present invention can be used with top-loading washing machines, such as those shown in U.S. Pat. No. 5,353,613 or U.S. Pat. No. 5,150,589 by way of example but without limitation, each of which is hereby incorporated by reference in its entirety. Certain features, aspects and advantages of the present invention also can be used with electric machines in other types of apparatus, such as hybrid vehicles, in-wheel motors (e.g., as used in bicycles and scooters), car alternators, industrial electric motors, generators, and hand held tools, for example but without limitation.

As shown in FIG. 1, the illustrated washing machine 100 comprises an outer cabinet 104. The outer cabinet 104 houses a tub 106 with a wash drum 110 mounted inside of the tub 106. The wash drum 110 rotates within the generally stationary tub 106.

With continued reference to FIG. 1, a motor 112 is mounted proximate a rear of the illustrated tub 106. The motor 112 is connected to the drum 110 such that the motor 112 can directly rotate the drum 110 in the illustrated configuration. As such, the motor 112 forms at least a portion of the direct drive assembly 102.

The illustrated motor 112 comprises a stator 114. The stator 114 can be connected to a wall 116 of the tub 106 directly or indirectly. For example but without limitation, a bearing retainer or a mounting plate assembly can be used to connect the stator 114 to the wall 116. In the illustrated configuration, the wall 116 of the tub 106 is a rear wall and the wall 116 defines a secondary surface to which the stator 114 can be secured. The secondary surface could be a side wall, a bottom portion, a top portion or any other suitable portion of the tub 106, depending upon the orientation of the tub 106, or any other substantially non-rotating component of an apparatus with which the motor 112 is used.

The illustrated motor 112 also comprises a rotor 120 that extends radially outward of the stator 114, such that the motor 112 comprises a so-called inside-out brushless DC motor or salient pole motor.

The rotor 120 can be secured to a driveshaft 122 in any suitable manner and the driveshaft 122 can be secured to the wash drum 110 in any suitable manner. In the illustrated configuration, the driveshaft 122 is configured to rotate about a generally horizontal axis. In some configurations, the drive shaft 122 can be configured to rotate about a generally vertical axis (e.g., in a top-load washing machine) or any other angle of orientation. Thus, certain features, aspects and advantages of the present invention can be used with driveshafts that extend in any direction with respect to gravity or orientation of the axis of rotation.

Figure 2:
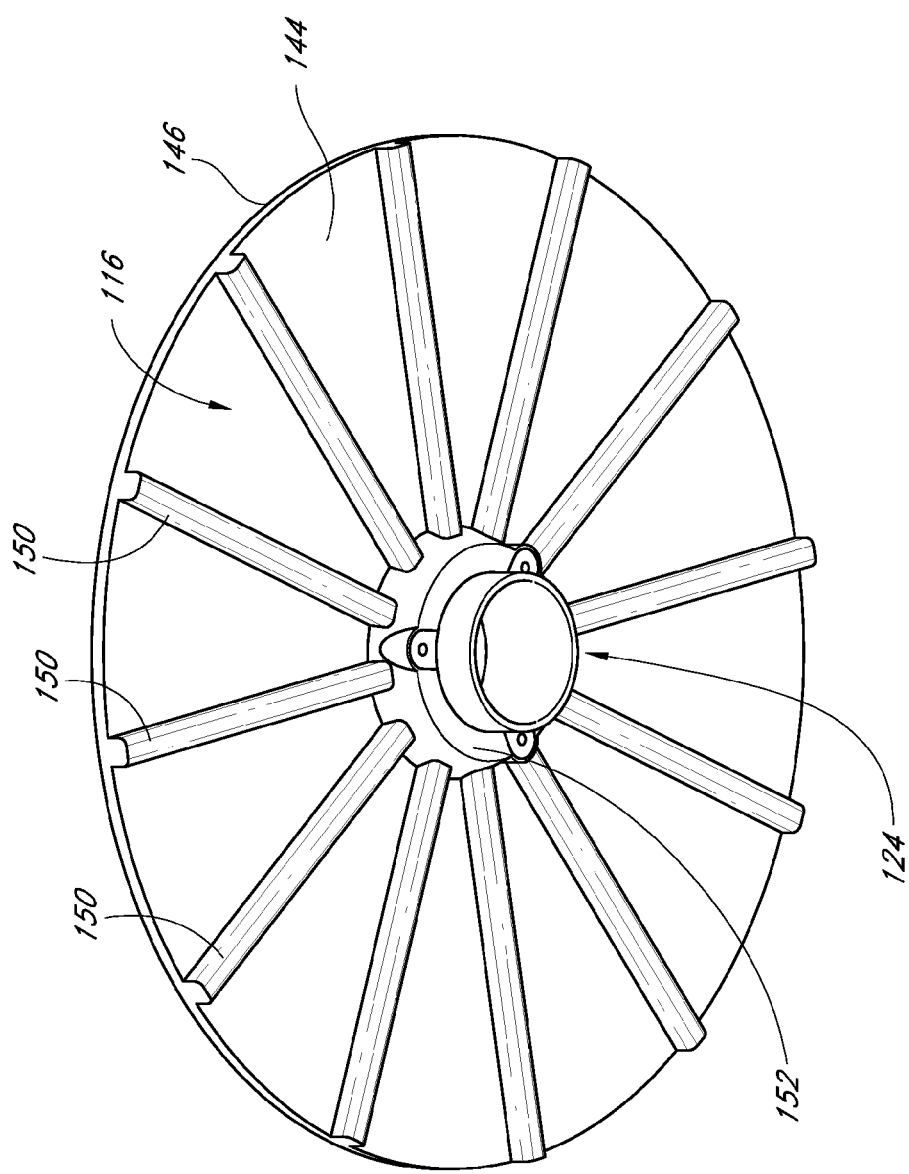
FIG. 2 is a rear perspective view of a wall of a tub and a bearing housing of the washing machine of FIG. 1.

With reference to FIG. 2, a bearing housing 124 is supported by the wall 116. The bearing housing 124 can be formed from any suitable material, including but not limited to aluminum, iron, steel or a composite material, for example.

Figure 3:
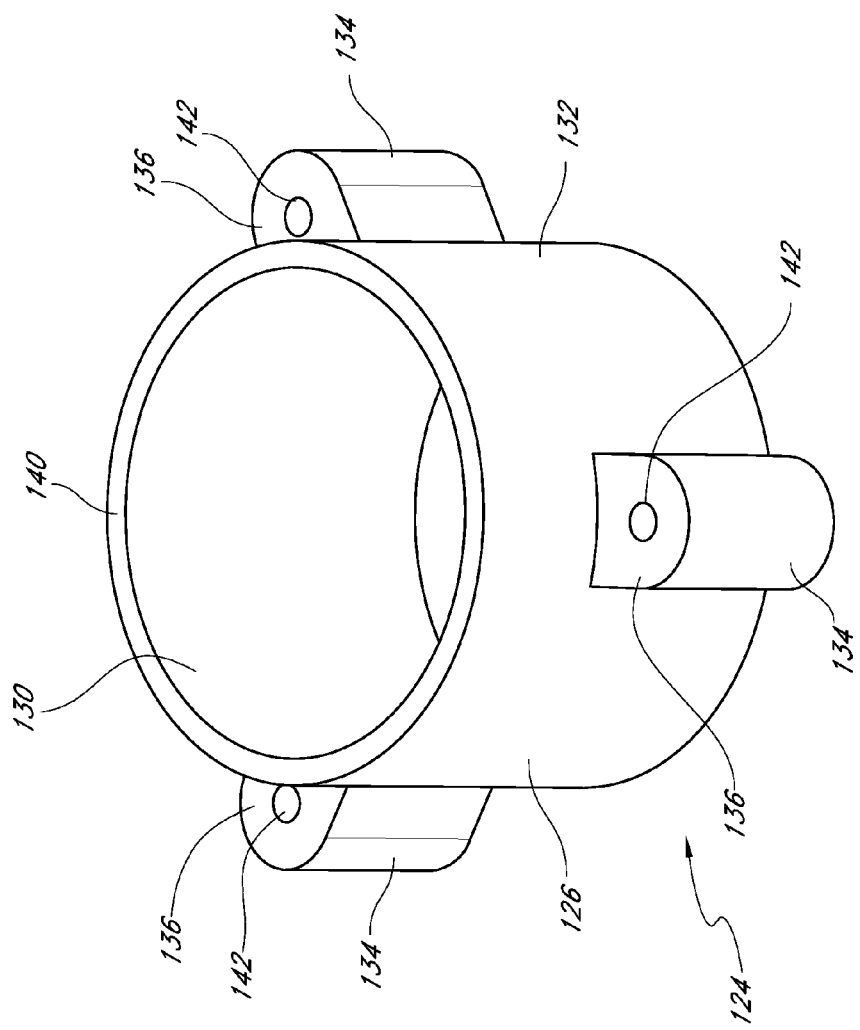
FIG. 3 is a rear perspective view of the bearing housing of FIG. 2.

As shown in FIG. 3, the bearing housing 124 preferably comprises a generally cylindrical main body 126. In the illustrated configuration, the bearing housing 124 comprises an inner wall 130 and an outer wall 132. The inner wall 130 and the outer wall 132 are substantially cylindrical and the thickness of the bearing housing 124 defined between the inner wall 130 and the outer wall 132 is substantially uniform. In some configurations, however, only the inner wall 130 is substantially cylindrical.

With continued reference to FIG. 3, the illustrated bearing housing 124 also comprises one or more mounting bosses 134. In the illustrated configuration, three mounting bosses 134 radiate outward from the outer wall 132 of the main body 126. Using three mounting bosses 134 is preferred due to the improved degree of balance that can be obtained. In some configurations, two, four, five, six or more mounting bosses 134 can be used.

Figure 4:
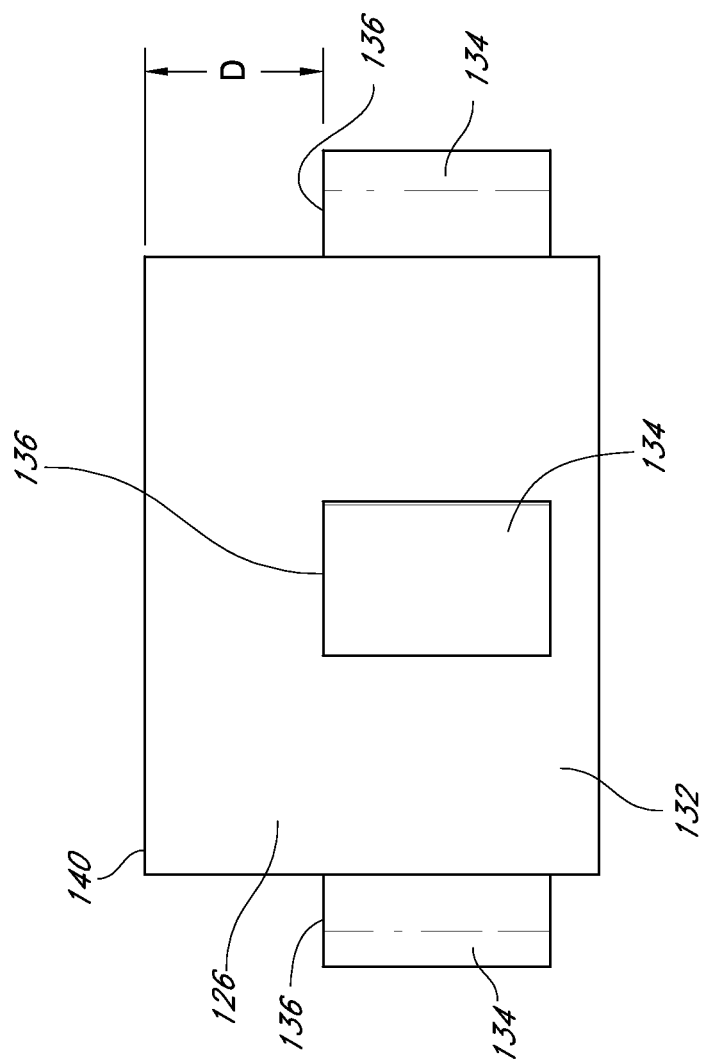
FIG. 4 is a side elevation view of the bearing housing of FIG. 2.

With reference to FIGS. 3 and 4, each of the mounting bosses 134 preferably comprises a mounting surface 136. The mounting surface 136 preferably is spaced from a motor end 140 of the main body 126. In some configurations, the mounting surface 136 and the motor end 140 are separated by a distance D of between about 0 and about 25 mm apart on a vertical axis machine and between about 25 mm to about 50 mm on a horizontal axis machine. In some configurations, the distance D is between about 0 and about 50 mm. In one configuration, the distance D is about 25 mm.

With reference again to FIG. 3, each of the mounting bosses 134 preferably comprises an opening 142. Preferably, the openings 142 comprise holes. More preferably, the openings 142 comprise holes that have been tapped to receive threaded components. In some configurations, the holes can be blind.

Figure 9:
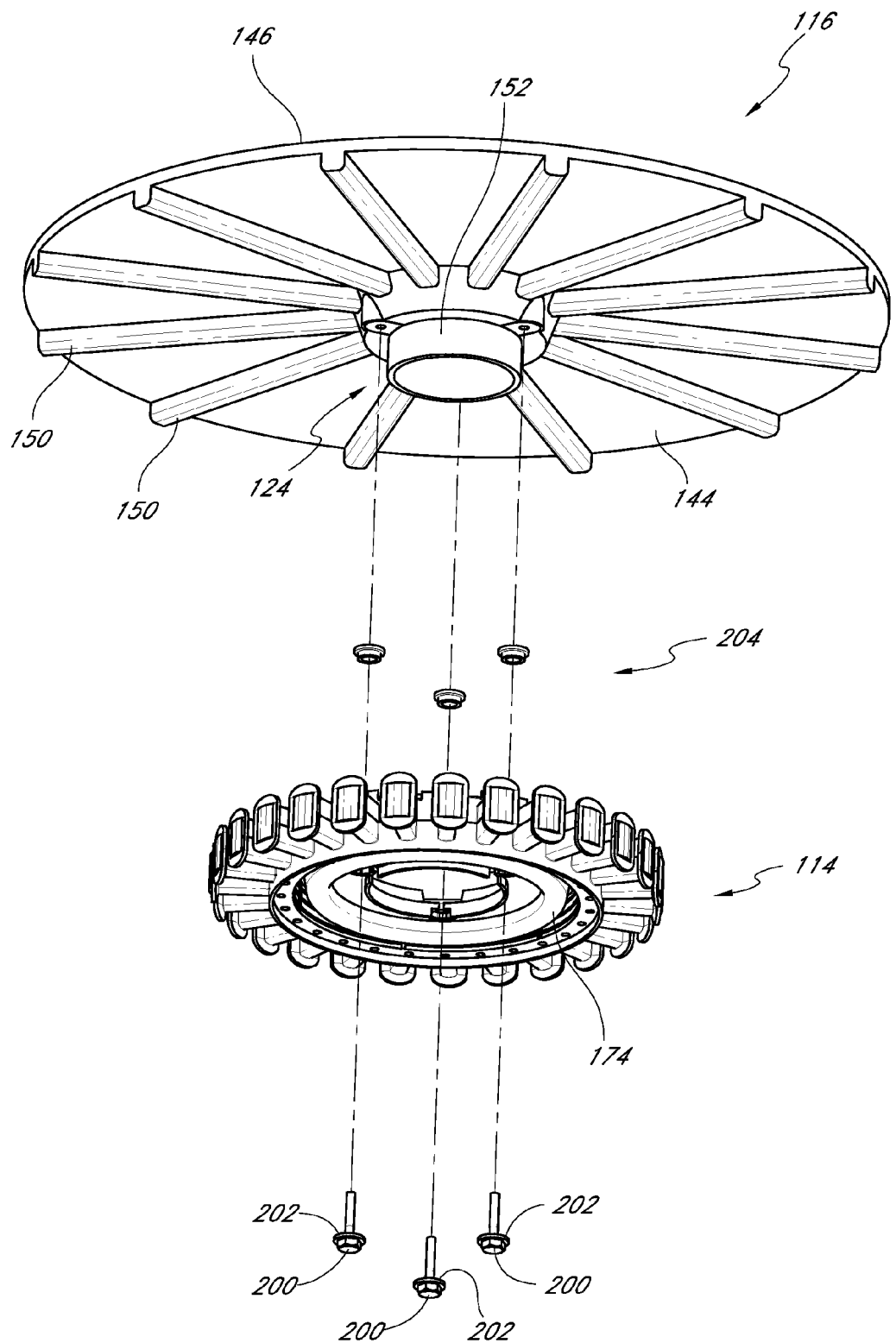
FIG. 9 is an exploded view of the stator and the wall of FIGS. 2 and 5.

With reference to FIG. 9, the wall 116 of the tub 106 is shown with the stator 114 being mounted to the wall 116. The bearing housing 124 can be secured to the wall 116 in any suitable manner. Preferably, however, the wall 116 is molded around the bearing housing 124. More preferably, the wall 116 is overmolded with the bearing housing 124.

The wall 116 has a motor-side surface 144 and a drum-side surface 146 that generally is opposite of the motor-side surface 144. As shown, the motor-side surface 144 of the wall 116 comprises a plurality of radially extending stringers 150. The stringers 150 provide reinforcement to the wall 116. Other configurations can be used to reinforce the wall 116.

The wall 116 also comprises a generally central hub portion 152. The stringers 150 in the illustrated configuration radiate outward from the central hub portion 152. The central hub portion 152 generally surrounds the bearing housing 124. The bearing housing 124 and the central hub portion 152 can be secured together such that the bearing housing 124 will not rotate relative to the central hub portion 152 of the wall 116.

Figure 5:
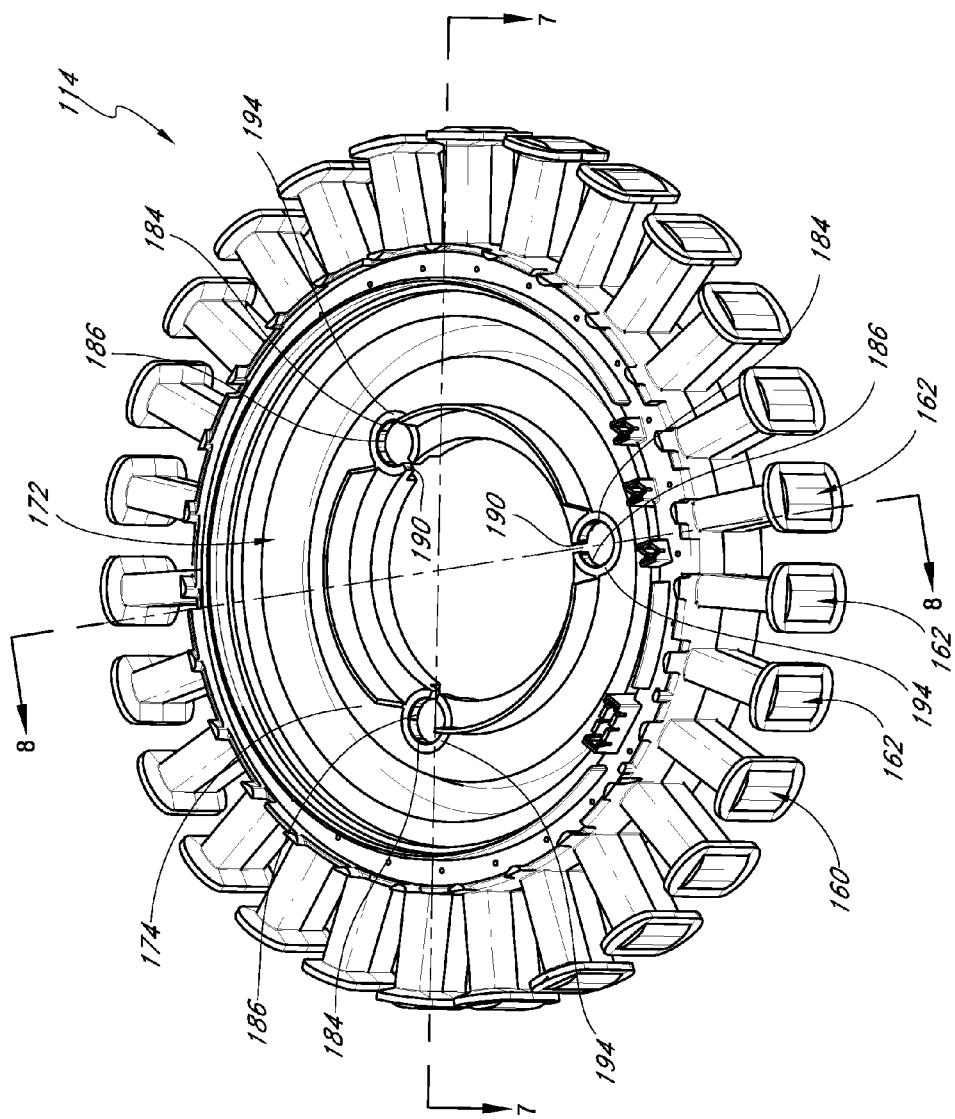
FIG. 5 is a perspective view of a stator of the motor of FIG. 1.
Figure 6:
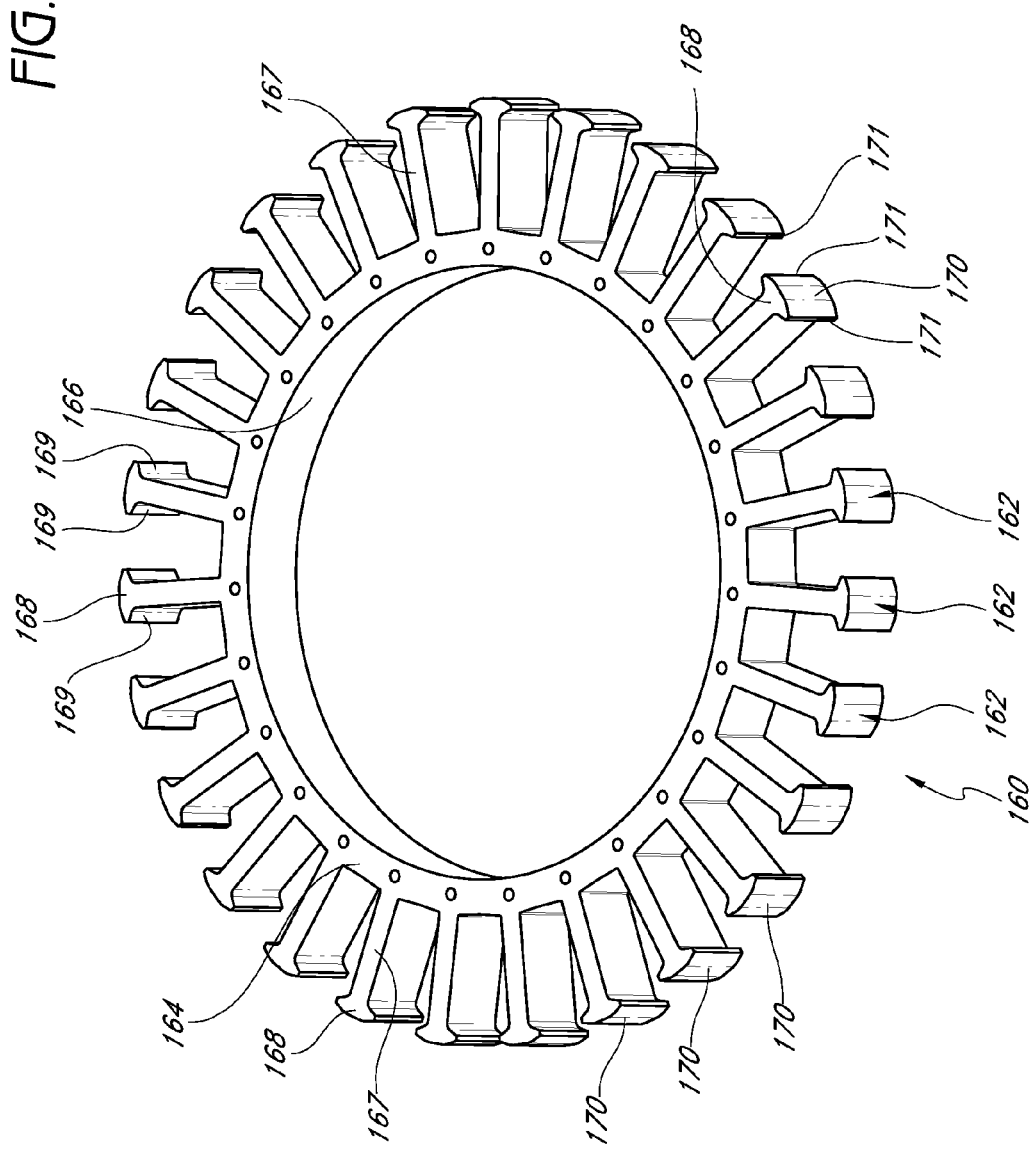
FIG. 6 is a perspective view of a ferromagnetic magnetizable member of the stator of FIG. 5.

With reference now to FIG. 5, the stator 114 according to one configuration is shown in detail. The illustrated stator 114 is shown without windings for clarity. The stator 114 comprises a ferromagnetic magnetizable member 160 having salient poles 162. The member 160 is better shown in simplified form in FIG. 6. The stator 114, including but not limited to the member 160, can be formed in any suitable manner. For example, in some configurations, the member 160 of the stator 114 can be a non-helically wound stator. In other configurations, the member 160 of the stator 114 can be helically wound, including in the manner described below. In some forms, the stator may have an overall diameter between about 150 mm and about 500 mm, between about 200 mm and about 400 mm or between about 250 mm and about 350 mm.

The poles 162 extend outwardly from a yoke 164. The yoke 164, sometimes called a spine, can define a wall 166 that forms an inner circumference of the member 160. Each of the poles 162 generally comprises a pole stem 167, sometimes called a pole body, that extends between the yoke 164 and a pole tip 168. The pole tips 168 comprise pole faces 170 that are positioned along an outer circumference of the stator 114. The profile of each of the pole tips 168 also comprises a pole tip back 169, which faces the yoke 164, and pole tip ends 171, which face pole tip ends 171 of adjacent poles 162.

With reference again to FIG. 5, the stator 114 also comprises a frame 172 that supports the ferromagnetic magnetizable member 160. In some configurations, the frame 172 is formed of a plastics material. The frame 172 preferably is formed of polybutylene terephthalate plastic or the like. The frame 172 preferably does not cover the pole faces 170 of the member 160.

The frame 172 can be formed in any suitable manner. For example but without limitation, the frame 172 can be formed using the technique disclosed in U.S. Pat. No. 5,150,589, which is hereby incorporated by reference in its entirety. As disclosed in U.S. Pat. No. 5,150,589, the frame 172 is formed by injection molding around the member 160 and preferably the frame 172 does not completely cover the pole faces 170 of the member 160. In some configurations, at least a portion of the pole faces 170 may be covered. The injected molded frame preferably provides terminal sockets. When the poles are wound, the winding machinery places tails of the winding wires automatically in the terminal sockets and external wiring connections, such as of the spade type, for example but without limitation, can be inserted into the sockets. Alternatively some or all of these connections can be completed manually.

Figure 7:
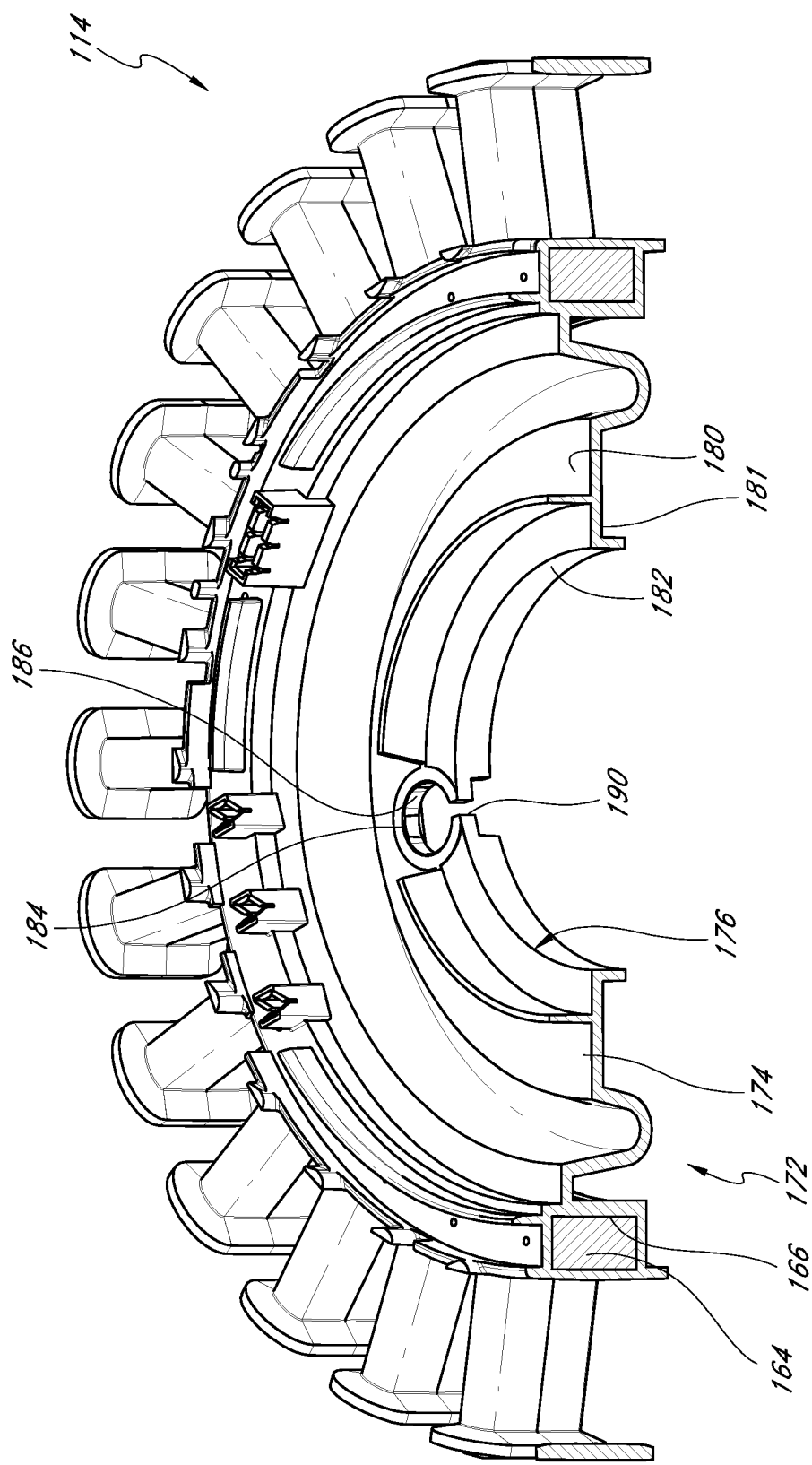
FIG. 7 is a section taken along the line 7-7 in FIG. 5.

With reference to FIG. 5 and FIG. 7, the illustrated frame 172 comprises a web 174 that extends radially inward from the inner wall 166 of the yoke 164. The web 174 comprises a central opening 176 that fits over the outer wall 132 of the main body 126 of the bearing housing 124. In the illustrated configuration, the web 174 comprises a wall-side surface 180 and a rotor-side surface 181. The central opening 176 preferably is defined by a flange 182. The illustrated flange 182 extends away from the wall side surface 180. Other configurations are possible.

Figure 8:
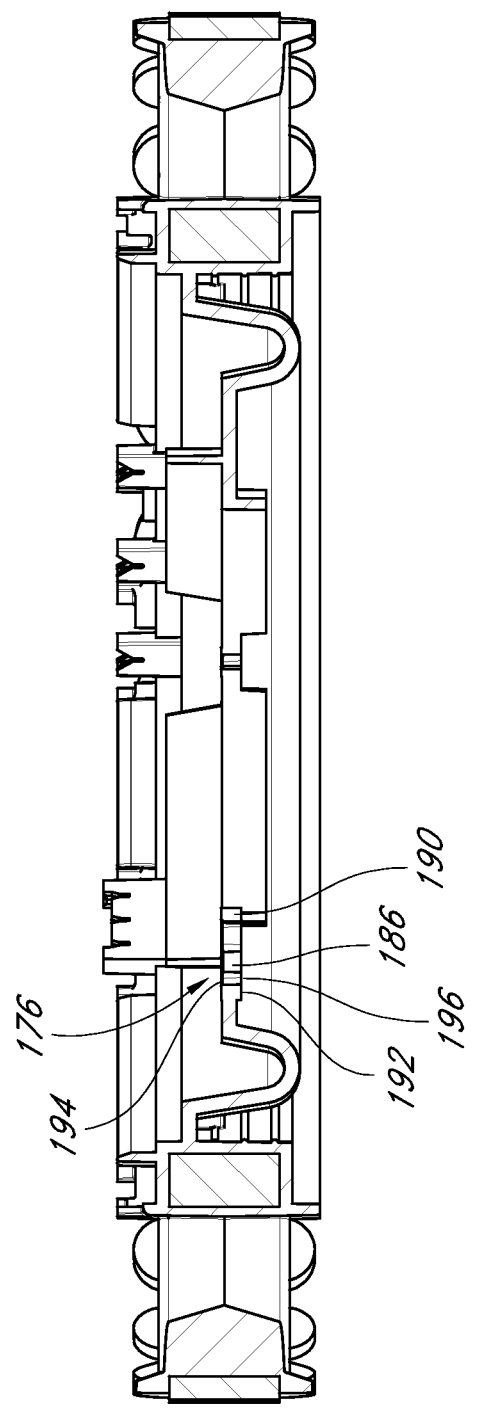
FIG. 8 is a section taken along the line 8-8 in FIG. 5.

With reference again to FIG. 5, the web 174 comprises at least one opening 184. In the illustrated configuration, the web 174 comprises three openings 184. The three openings 184, like the openings 142 of the bearing housing 124, preferably are positioned about 120 degrees apart about a central axis. One or more of the openings 184 can be defined by a fully encircling surface; however, the illustrated openings 184 are not fully enclosed. Rather, each of the illustrated openings 184 is defined by a wall 186 with a gap 190 positioned along the central opening 176 of the web 174. In other words, the openings 184 and the central opening 176 can be in direct communication through the gaps 190. In addition, as shown in FIG. 8, each of the illustrated openings 184 extends through an embossment 192 that provides an increased web thickness generally adjacent each of the openings 184. Preferably, flat landings 194, 196 are provided at each axial end of each of the openings 176.

With reference to FIG. 9, the stator 114 is secured to the wall 116 of the bearing housing 124 using any suitable fasteners. In the illustrated configuration, the fasteners are bolts or screws 200. A washer 202 can be interposed between the head of each fastener 200 and the web 174 of the stator 114. Preferably, spacers 204 are interposed between the wall 116 and the stator 114. More preferably, the spacers 204 are interposed between the web 174 of the stator 114 and the bearing housing 124 of the wall 116. Even more preferably, the spacers are interposed between the mounting surface 136 of the mounting bosses 134 on the bearing housing 124 and the flat landings 194 of the web 174 of the stator 114. Thus, the spacers 204 mount between the overmolded portion of the stator 114 and the bearing housing 124 of the wall 116 in the illustrated embodiment. As such, the spacers 204 mount between a plastic component (e.g., the web 174) and a metallic component (e.g., the bearing housing 124). In some applications, the spacers 204 are interposed between a mounting surface and a portion of the stator 114 to allow the stator to be mounted to the mounting surface while being suitably spaced therefrom.

The spacers 204 advantageously provide a custom mounting geometry to connect the stator 114 to the tub 106 for differing design considerations. Because the speed, the mass, and the size of the drum 110 and the stator 114 can vary for each machine design, the spacers 204 allow customization of connection points between the tub 106 and the stator 114. Thus, the spacers 204 facilitate modularized assembly. In other words, the spacers 204 can have different proportions to allow the drum to stator interface to be secured with differing fastener lengths and with differing spacing between the drum and the stator.

The spacer 204 preferably is formed of a plastics material. More preferably, the spacer 204 is formed of a structural polymer. In some configurations, the spacer 204 is formed of polythenylene sulfide (PTS), glass filled PET or other suitable materials. In some configurations, the spacer 204 is formed of a substantially non-conductive material. In particular, the spacers 204 preferably are formed of a material that is non-conductive of electricity in the ranges commonly found in an electric motor. In some configurations, the entire spacer 204 is formed from a non-conducting structural polymer.

The material used for forming the spacers 204 can be selected in view of the specific application. The spacers 204 transfer axial forces from the fasteners 200 to the bearing housing 124. In other words, the spacer 204 typically is constantly under a compressive force (i.e., the force from the head of the fastener 200 is transmitted through a washer to the spacer 204 and to the bearing housing 124). In addition, the spacers 204 are subjected to forces during torque transmission and during out of balance loads in the washing machine 100. Thus, in some embodiments, the compressibility of the material preferably is substantially constant (i.e., creep in the material is insubstantial) when the spacers are placed in compression. For example, glass fiber reinforcement can be added to PTS or PET between about 10% and about 50% by weight to provide a substantially constant compressibility (i.e., less than about 2%) over a range of compressive forces from about 400 newtons to about 1200 newtons.

The use of a structural polymer for the spacers 204 unexpectedly improves the performance of the spacers 204. In particular, the structural polymer spacers 204 allow the compressive force of the metal fasteners 200 to deliver a more dampened compressive load relative to spacers formed of metal. In other words, less physical shock is delivered through the spacers.

Figure 10:
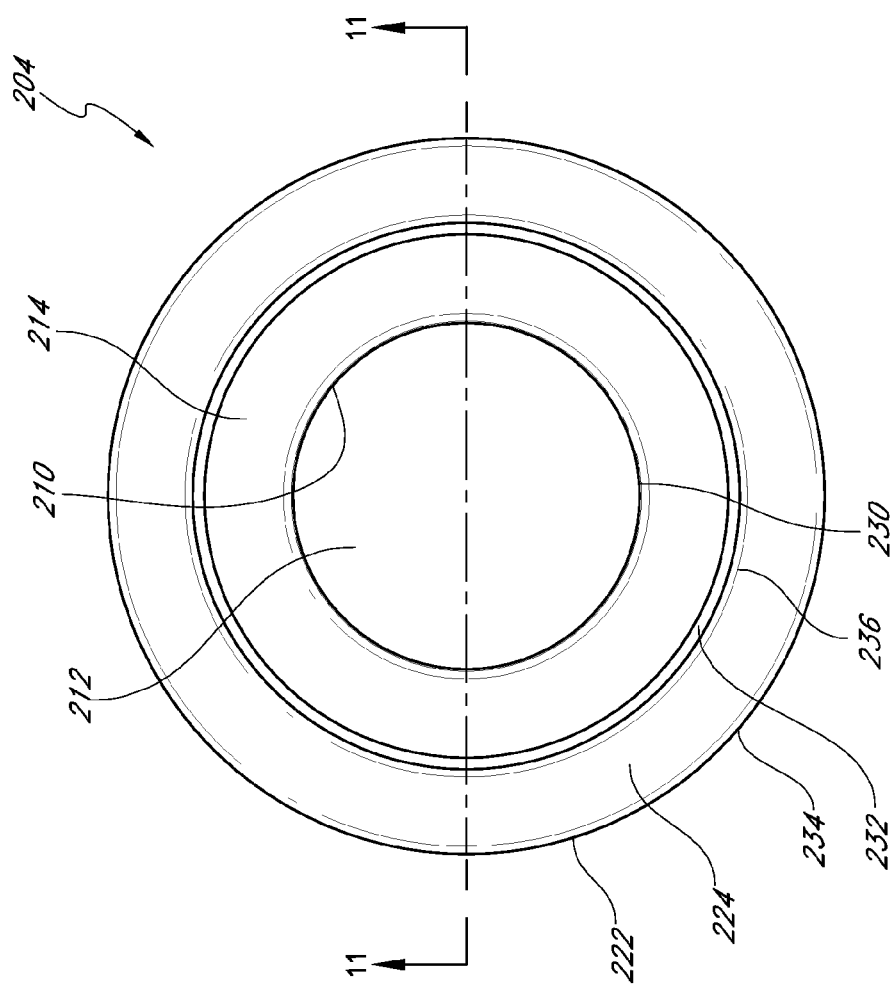
FIG. 10 is a plan view of a spacer used between the stator and the wall in FIG. 9.
Figure 11:
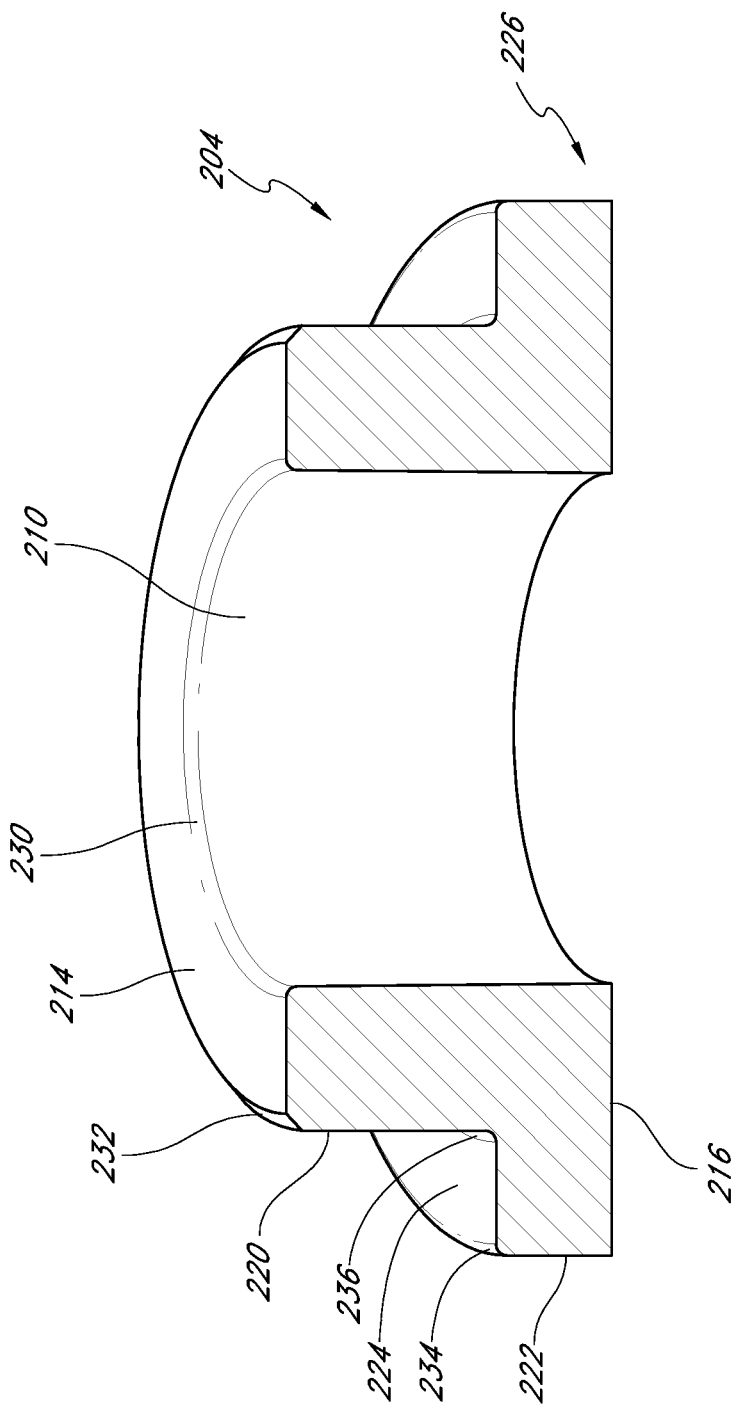
FIG. 11 is a section taken along the line 11-11 in FIG. 10.

With reference to FIGS. 10 and 11, the illustrated spacer 204 comprises an inner wall 210. The inner wall 210 can define a passage 212 that is generally cylindrical in the illustrated configuration. Preferably, the passage 212 defines a close-fit hole for the associated fastener 200 to pass through. In some configurations, the inner wall 210 is provided with a draft angle of at least about 0.5 degrees to assist with manufacturing.

The passage 212 can have other cross-sectional shapes and the shapes can vary along the length of the passage 212. For example, the passage 212 can have a cross-section that is at least partially round, oval, square or any generally open shape that will permit the fastener 200 to extend through the spacer 204. In some configurations, the passage 212 could be a larger internal diameter hole than the fastener intended, a non-round hole or an asymmetrical hole, such as a hole with one or two flat faces to reduce the likelihood that the fastener (e.g., a fastener with a flat edge) will rotate relative to the spacer 204. In some configurations, a slot can extend the length of the passage 212 such that the passage can expand or contract to some degree in a radial direction. In other configurations, the slot can extend in a substantially axial direction. In yet other configurations, the slot can extend in a spiral or a slanted manner. The generally cylindrical shape shown in FIGS. 10 and 11 has been found to be advantageously simple to manufacture.

The inner wall 210 extends fully through an axial length of the spacer 204. As such, the inner wall 210 generally extends between a stator-end surface 214 and a tub-end surface 216. The outer geometry of the spacers 204 can have any suitable configuration. In the illustrated configuration, the spacers comprise a generally cylindrical first outer portion 220 and a generally cylindrical second outer portion 222. In some configurations, the first and second outer portions 220, 222 are provided with a draft angle of at least about 0.1 degrees to assist with manufacturing. The first outer portion 220 and the second outer portion 222 are separated by a step surface 224 in the illustrated configuration. Other configurations are possible.

Figure 12:
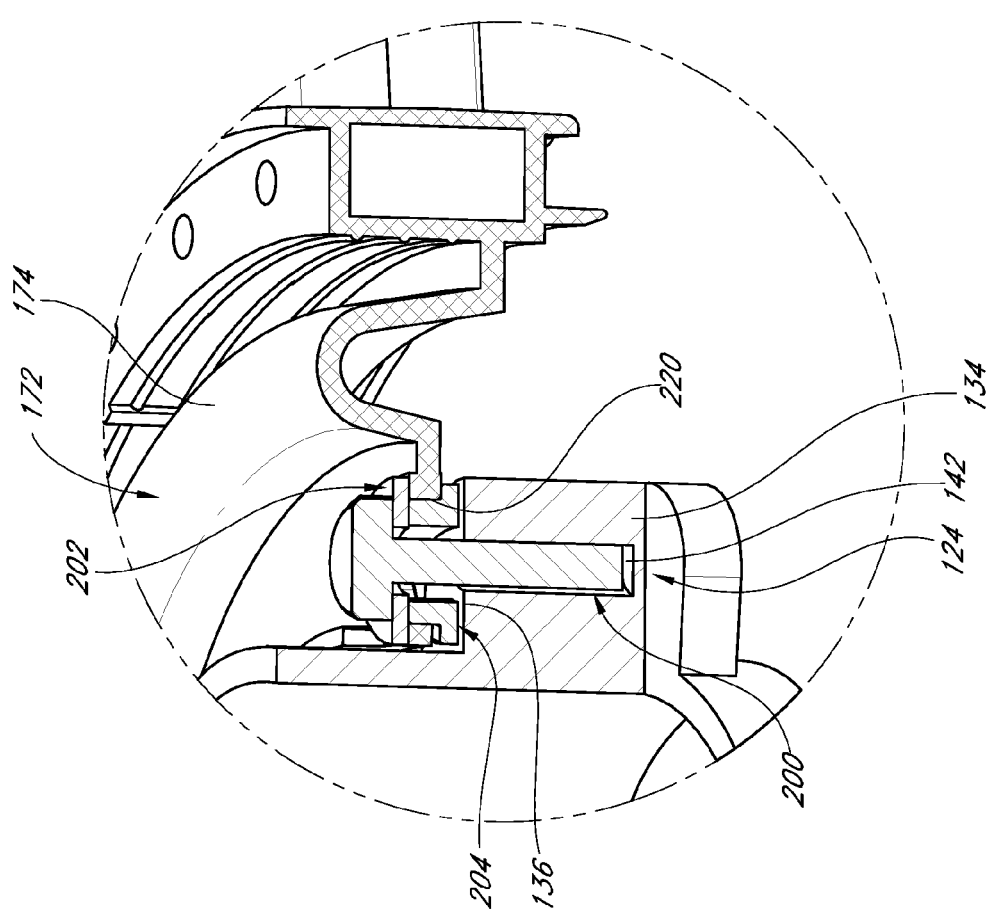
FIG. 12 is an enlarged partial section of a connection between the stator and the wall of FIG. 9.

The tub-end surface 216, the second outer portion 222 and the step surface 224 define a flanged end 226 in the illustrated configuration. Preferably, the step surface 224 (e.g., the difference between the tub-end surface 216 and the stator-end surface 214) is greater than the thickness of the flanged end 226 (e.g., the axial length of the second outer portion 222). The reduction in area from the tub-end surface 216 to the stator-end surface 214 reduces the area of the stator-end surface 214. As shown in FIG. 12, the reduced cross-section of the first outer portion 220 can extend into the openings 184 in the web 174 of the stator frame 172. Thus, the reduced profile of the first outer portion 220 enable further physical engagement between the spacer 204 and the stator frame 172.

Because the spacers are formed of a structural polymer, non-standard geometry can be accommodated between the surfaces that interface with the stator 114 and the wall 116. For example, in some applications, the polymer bonding surface areas of the illustrated structural polymer spacers 204 can be larger than otherwise possible with a metal spacer so the localized stresses on the surfaces of spacers 204 are reduced. In some configurations, the spacer 204 can have surface features or surface texture to improve the connection between the spacer 204 and the surfaces being connected (e.g., the bearing housing 124 and the stator frame 172). In some configurations, the spacer 204 and one or more of the surfaces against which the spacer 204 will bear (e.g., the mounting surface 136 of the bearing housing 124 and the flat landings 194 of the stator frame 172) can be provided with interlocking or cooperating structures. For example, asymmetric flange edges, protrusions from one or more of the surfaces (e.g., posts, positive dimples, with mating hollows) or other features that enable engagement of the spacers 204 with one or more of the surfaces that the spacer abuts. The interlocking or cooperating structures can comprise locating features and/or can transfer loads between the spacers 204 and another structure (e.g., the bearing housing 124 or the stator frame 172).

More broadly stated, any positive feature on the spacer 204 can have a corresponding reverse shaped negative space formed on the surface of against which the spacer abuts, or vice versa. Preferably, the engaging features will be able to be machined into tooling steel and may result in a lower level of residual stress in the spacer 204, the frame 172 and/or the bearing housing 124. The depth and specific geometry of the engaging features may depend on the forces that need to be opposed by the position of the spacer 204. For example, in some applications, the female portion of the engaging features may have a depth of about 3 mm and sufficient surface area such that the torsional stress would be less than about ⅓ of the yield stress of the polymer material used for the spacer 204. In some applications, the geometry of the engaging features could be determined by making a depth and a cross sectional area of the feature sufficient to spread any transverse load over a sufficiently broad area to reduce the likelihood of failure in the interlock. In one configuration, the bearing housing 124 can comprise a lip, flange or the like that the spacer 204 can locate on or against. For example, the lip or flange would encircle the opening 142 in the bearing housing 124 and the spacer 204 can be press-fit or slip-fit, for example but without limitation, on the lip or flange.

With reference to FIG. 11, the intersection of the inner wall 210 and the stator-end surface 214 preferably comprises a chamfered edge 230. In some configurations, the intersection of the stator-end surface 214 and the first outer portion 220 comprises a chamfered edge 232. In some configurations, the intersection between the second outer portion 222 and the step surface 224 comprises a chamfered edge 234. In some configurations, the intersection between the first outer portion 220 and the step surface 224 comprises a filleted surface 236.

Preferably, the geometry of the spacers 204 as a whole is formed with volumes and proportions to accept expected loads from the speed and position of motion (e.g., radial distance from center of rotation) of the spacers 204. In addition, the size, proportions and dimensions of various portions of the spacer 204 can be varied based upon the functional characteristics of the machine. For example, once a top speed of rotation, a mass of the drum, and a radial distance of the fasteners from a central rotational axis is determined, then the outer radius of the flange, the thickness of the flange, the thickness of cylinder wall and the height of the spacer can be designed for the loads generated from the specific motor geometry with an appropriate factor of safety. The spacer 204 preferably will insulate the fastener from the stator 114 and tub 106 and position the fastener 200 with minimized localized stress on the surfaces of the tub 106 and the stator 114 because the area of contact will be higher than it would be with a metal spacer of similar mass and strength.

With reference again to FIG. 6, as discussed above, the ferromagnetic magnetizable member 160 can be formed in any suitable manner. For example, the member 160 can be manufactured from connecting stacks of joined stator profile elements having alignment and joining notches at the ends of the elements. Preferably, however, the stator member is manufactured by a helical winding technique, such as that disclosed in U.S. Pat. No. 5,150,589 for example but without limitation, which is hereby incorporated by reference in its entirety.

Figure 13:
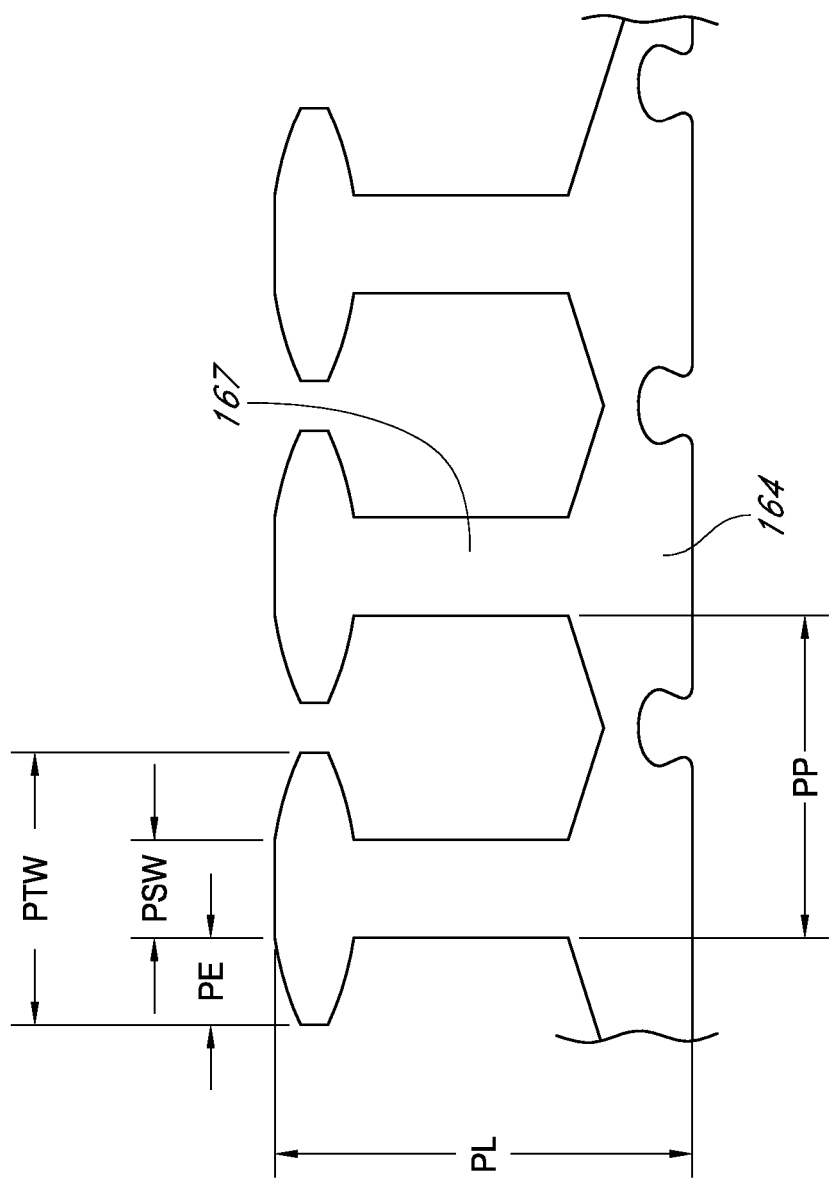
FIG. 13 is a simplified plan view of a core blank stack.

With reference now to FIG. 13, a portion of a core blank profile is illustrated with a number of dimensional attributes identified for ease of discussion. The pole tips 168 have two main dimensions indicated: (1) a pole tip width PTW; and (2) a pole extension PE. As illustrated, the pole stems 167, which terminate at the pole tips 168, have a pole stem width PSW. Generally speaking, the sum of the pole stem width PSW and the two pole extensions PE define the pole tip width PTW. In addition, the pole length PL is shown. Finally, the distance from one pole to the next pole is defined as the pole pitch PP.

A core blank 302 can be continuously formed from a strip 300 of material. The strip 300, which is simplistically represented in FIG. 14 by dash-dot lines, preferably comprises electrical steel. In some configurations, the electrical steel can have a lightly insulated surface. In a preferred form, the sheet material used for the strip 300 is coated with an insulator on both surfaces of the sheet material to reduce the likelihood of electrical conductivity between adjacent layers after helical winding.

Figure 14:
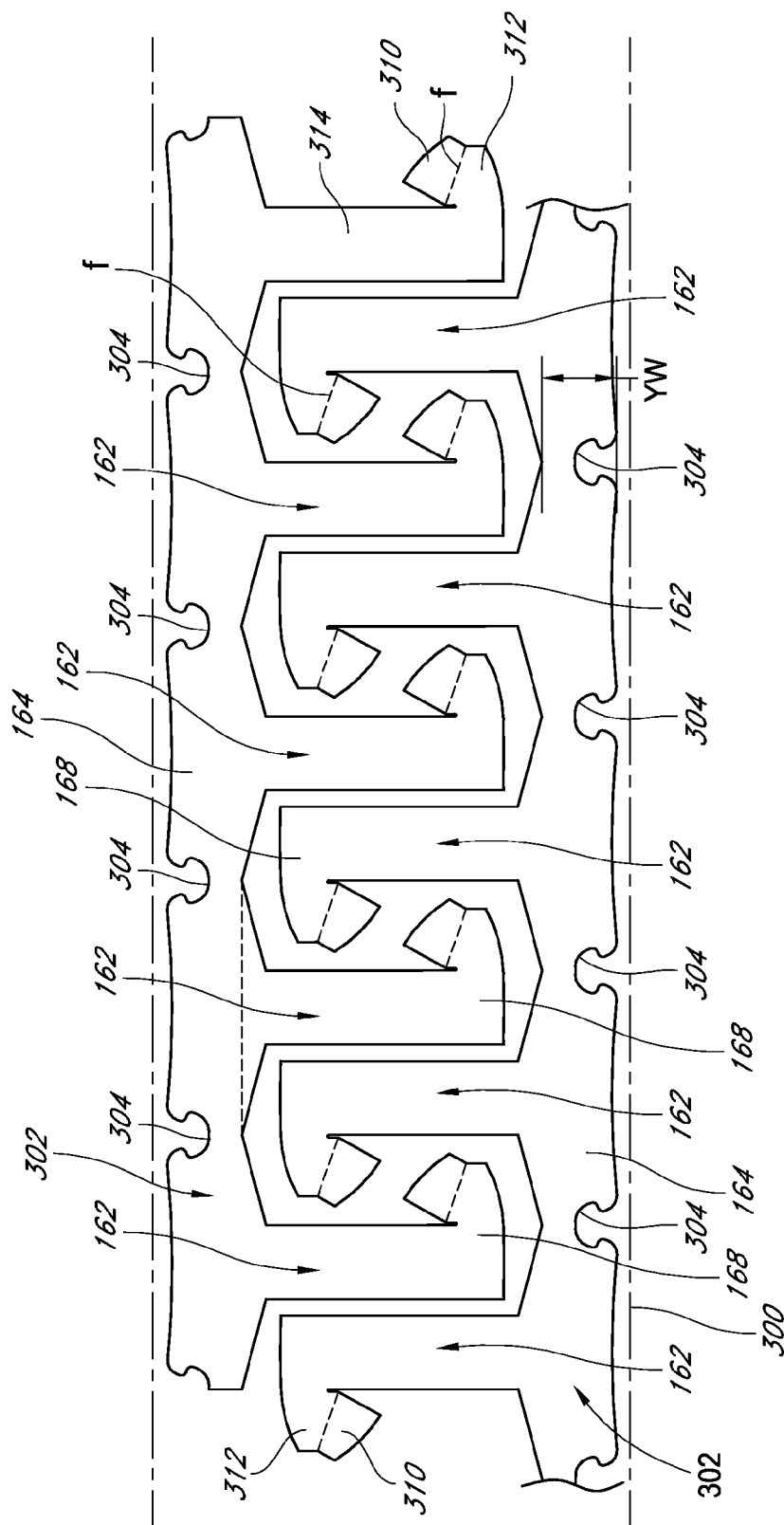
FIG. 14 is a plan view of a strip of material from which two core blanks for the stator of FIG. 5 can be formed.

At least one, and preferably more than one, core blank 302, which includes both poles 162 and the yoke 164, which extends between the poles 162, can be formed from the strip 300. Preferably, if two core blanks 302 are simultaneously formed, the two core blanks 302 are mirror images of each other, as shown in FIG. 14. Moreover, if two core blanks 302 are simultaneously formed, the two core blanks 302 preferably are interleaved (as shown) to reduce waste. Such an interleaved process is disclosed in U.S. Pat. No. 4,364,169 for example but without limitation, which is hereby incorporated by reference in its entirety.

When interleaving two core blanks 302 as shown in FIG. 14, the dimensions of the pole 162, the pole tip 168 and the pole length PL (i.e., the radial length of the pole 162) are interrelated. For example, a pole tip 168 with a large pole tip width PTW results in a wide pole face 170, which can increase the amount of magnetic field coupled into the stator pole 162 and, therefore, improve the performance of the motor 112. However, to reduce the likelihood of the magnetic field from the rotor saturating the steel in the pole stem 167, the pole 162 preferably has a minimum desirable pole stem width PSW. When interleaving two core blanks 302, the distance between adjacent pole stems 167 (i.e., the pole pitch PP) in each core blank 302 is approximately equal to the circumferential length of the yoke 164 divided by the number of poles 162 in the finished stator 114. Assuming a generally symmetrical pole tip configuration, the sum of the pole stem width PSW and pole tip width PTW must be less than or equal to the pole pitch PP (i.e., pole stem width PSW+pole tip width PTW≤pole pitch PP) given the spacing of the components on the sheet 300.

Another geometric relationship when interleaving relates to the pole length PL of the pole 162. In the case of a stator with poles extending radially outwards (e.g., FIG. 3 of U.S. Pat. No. 5,150,589), as the pole length PL is increased with a constant outside diameter, the circumferential length of the yoke 164 necessarily decreases. Because the circumferential length of the yoke 164 decreases, the pole pitch PP also decreases, which reduces the maximum dimensions of the pole stem width PSW and pole tip width PTW in view of the relationships explained above.

U.S. Pat. No. 6,559,572, which is hereby incorporated by reference in its entirety, sought to locally reduce, or neck in, the pole stem width at the end of the pole closest to the yoke, thereby allowing an increase in pole tip width while still maintaining interleaved forming. The structure resulting from this technique is less desirable because necking of the pole width reduces the strength of the poles in the region of the core. For this reason, necking also can reduce the possible pole length.

In addition, for motors, such as the motor 112, that can use sensorless vector control (see U.S. Pat. No. 6,577,096, for example but without limitation, which is hereby incorporated by reference in its entirety), not necking the pole (i.e., not having a portion of the pole with a reduced width) is believed to improve motor performance. It has been found that necking of the pole can result in increased magnetic saturation during operation under high torque loads. Sensorless vector control is very sensitive to magnetic saturation. Accordingly, when using sensorless vector control, stator pole profiles that do not feature a necked region are believed desirable. Thus, configurations that can increase pole tip width PTW while not causing a significant narrowing or necking of the pole stem width PSW are believed to be highly desirable in applications using sensorless vector control.

With reference to FIG. 14, the illustrated pole tips 168 are asymmetrical and provide a manner of increasing the pole tip width PTW without necessarily necking the pole stem 167. In short, by providing asymmetry in the blank 302, some of the geometric constraints discussed above can be overcome. For example, through use of asymmetric pole tip geometries, the sum of the pole stem width PSW and the pole tip width PTW no longer must be less than or equal to the pole pitch. Accordingly, a wider dimension can be used for the pole tip width PTW and/or the pole stem width PSW than possible without using the asymmetrical configurations. For example, in the illustrated configuration, the pole extension PE can be substantially doubled relative to the configuration not using asymmetry. In some configurations, the pole tip width, when assembled, is wider than the pole stem 167 by as much as three and a half times the width of the pole stem (i.e., the pole stem width PSW). Moreover, longer pole lengths PL also can be used. Because the pole tips 168 in the blank 302 are asymmetrical, the pole extension PE to each side of the pole stem width PSW is not the same in the blanks 302. The extent of the asymmetry of the poles can vary depending on the dimensional requirements for pole stem 167 and pole tips 168. In the illustrated embodiment of FIG. 14, the pole tip 168 extends outward from the pole stem 167 in only one direction along the entire blank 302 since the void extends the full length of the pole tip 168 on the first side of the pole stem 167 such that there is no pole tip 168 on the second side of the pole stem 167.

Figure 17:
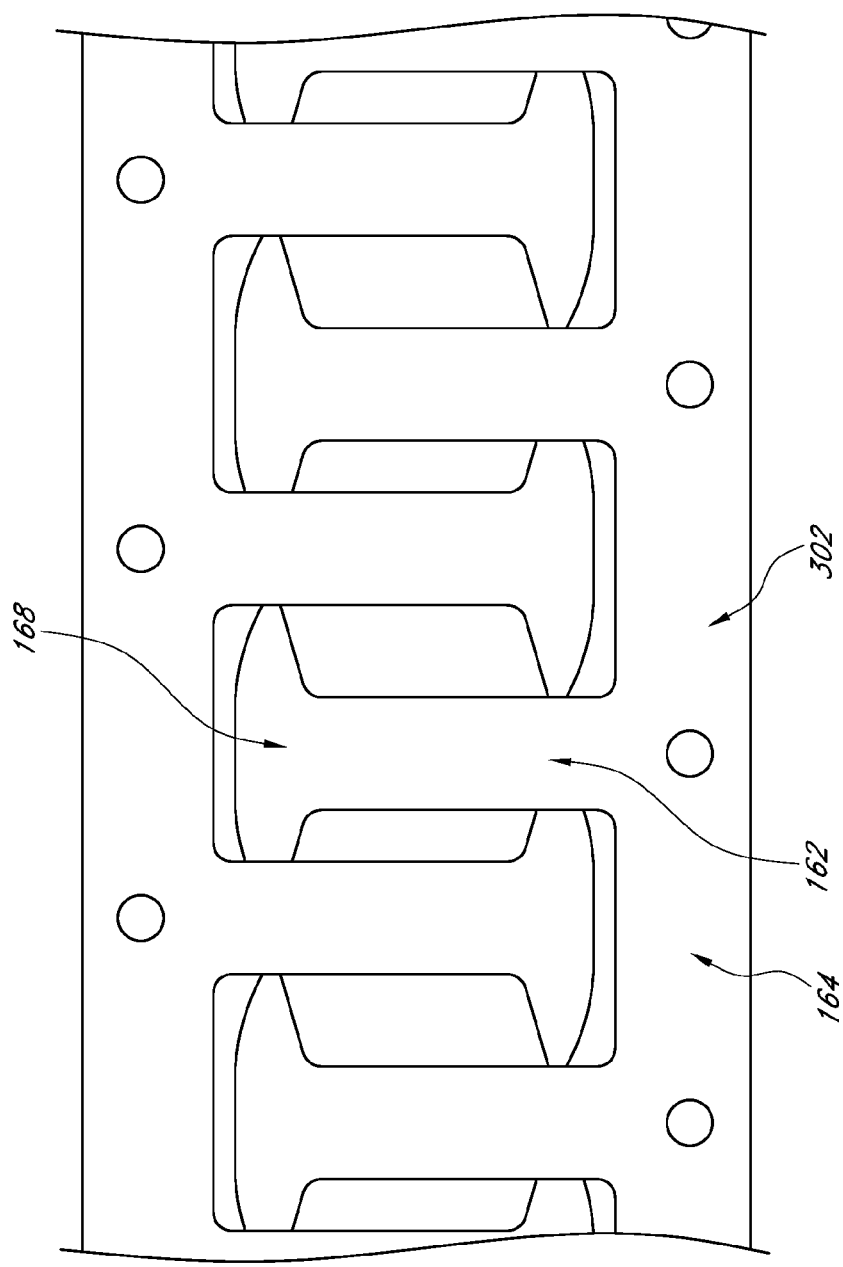
FIG. 17 is a plan view of a strip of material from which two core blanks for the stator of FIG. 5 can be formed.

With reference to FIG. 17, the illustrated pole tips 168, like those in FIG. 14, are asymmetrical and provide a manner of increasing pole tip width PTW without necessarily necking the pole stem 167. In this configuration, the pole tip 168 extends the full length outward on the first side of pole stem 167 and extends a fraction of the full length outward from the second side of pole stem 167 since the void extends only a fraction of the full length of the pole tip 168 on the first side of the pole stem 167. In some embodiments, the extension of pole tip 168 from the second side of pole stem 167 may range from about 0% to about 100% of the extension of the pole tip 168 from the first side of pole stem 167. In other embodiments, the extension of pole tip 168 from the second side of pole stem 167 may range from about 25% to about 80% of the extension of the pole tip 168 from the first side of pole stem 167. In other embodiments, the extension of pole tips 168 from the second side of pole stem 167 may range from about 1 mm to about 5 mm less than the extension of pole tip 168 from the first side of pole stem 167.

Preferably, the asymmetry is mirrored on the opposing core blank 302 in the pair of core blanks 302. With the mirror image core blanks 302, one of the mirror image core blanks 302 can be inverted and placed atop the other of the mirror image core blanks 302. With the poles 162 aligned and when viewed from above, the appearance of a full pole tip 168 can be viewed. Furthermore, when the blanks 302 have been stacked and bent to form a lamination stack, the lamination stack exhibits general symmetry when viewed from above. However, the pole faces 170 would have gaps positioned between every other layer on opposing sides of the pole stem 167. In other words, the pole extensions PE would be formed from every other layer of the pole 162. As a result of the gaps, the poles extensions may be more easily saturated by magnetic fields than without such gaps.

Figure 15:
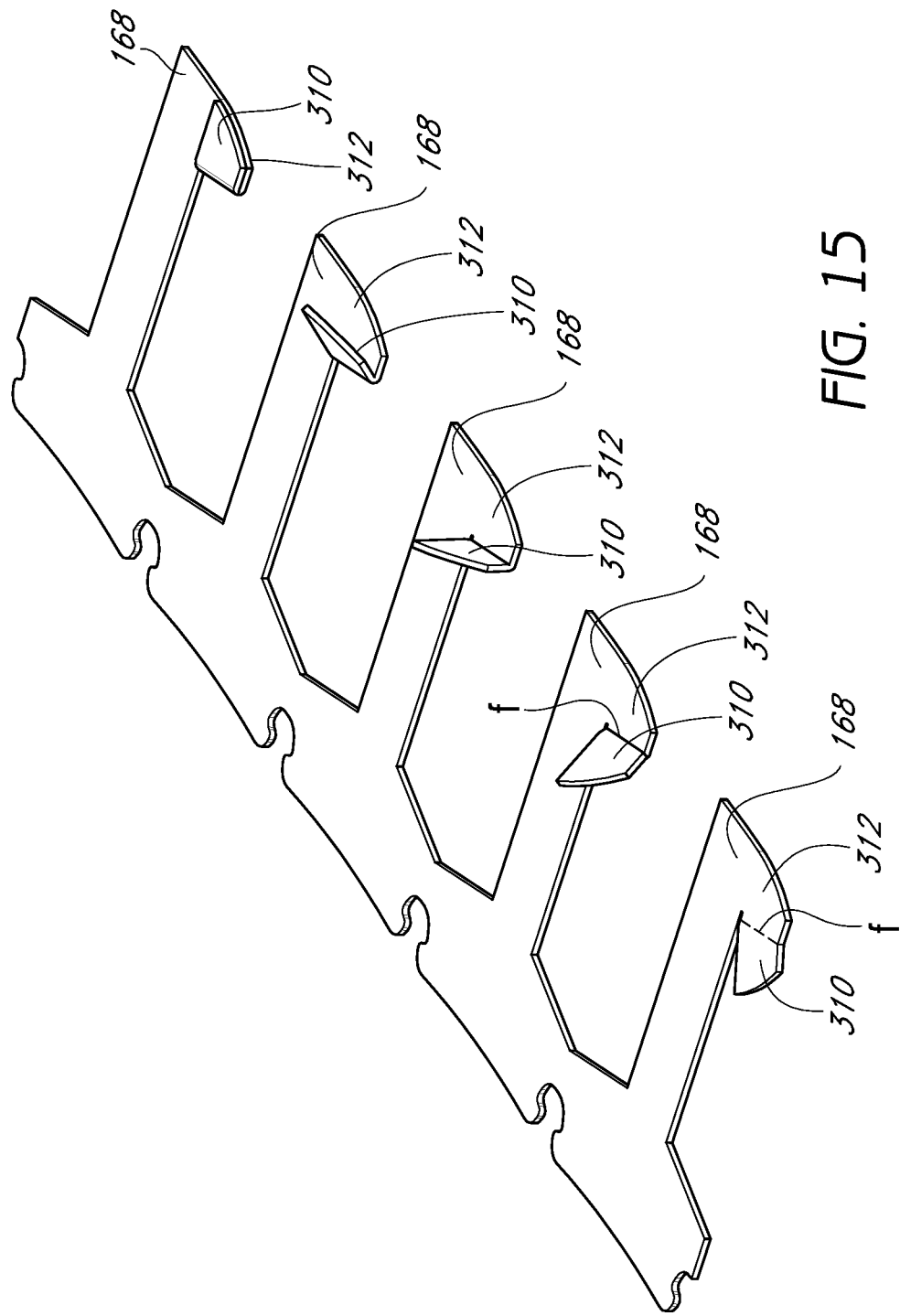
FIG. 15 is a perspective view of a core blank with auxiliary portions of pole ends being bent.

With reference to FIG. 15, the asymmetric core blanks 302 illustrated in FIG. 14 are shown with an auxiliary portion 310 being folded over at least another portion of the pole tip 168 to alleviate the easy saturation by substantially filling the gaps with the auxiliary portions while also allowing a generally symmetrical pole tip to be formed from asymmetrical components. The core blanks 302 illustrated in FIG. 14 can have at least a portion of the pole extension PE formed by folding a portion of the pole extension over itself. In some applications, however, it is possible to provide separate components that are applied to the existing pole extensions PE such that, when applied, the separate components substantially fill the gaps that otherwise would exist between layers.

Whether a folded component or a separate component, the resulting pole tip face 170 preferably is generally gapless. The gaps that would otherwise exist on the pole tip face 170 due to the use of the asymmetrical blanks 302 can be filled with the auxiliary portions 310, which can be integrally formed, be separate components or be a mixture of the two. While one or more gap may remain, in some applications, having no gaps on the pole tip face 170 is preferred. In addition, while it is desirable that the auxiliary portions 310 or the separate components fully match the shape profile (i.e., the profile of the pole tips 168 when viewed in plan view) and therefore fully fill the gap, at least the surface that defines the pole tip face 170 preferably is substantially gapless. In other words, the profile of the blanks and the profile of the separate components preferably match at least at the pole face. Having no or minimal gaps in the completed magnetizable member 160 improves saturation resistance of the completed magnetizable member 160.

Figure 16:
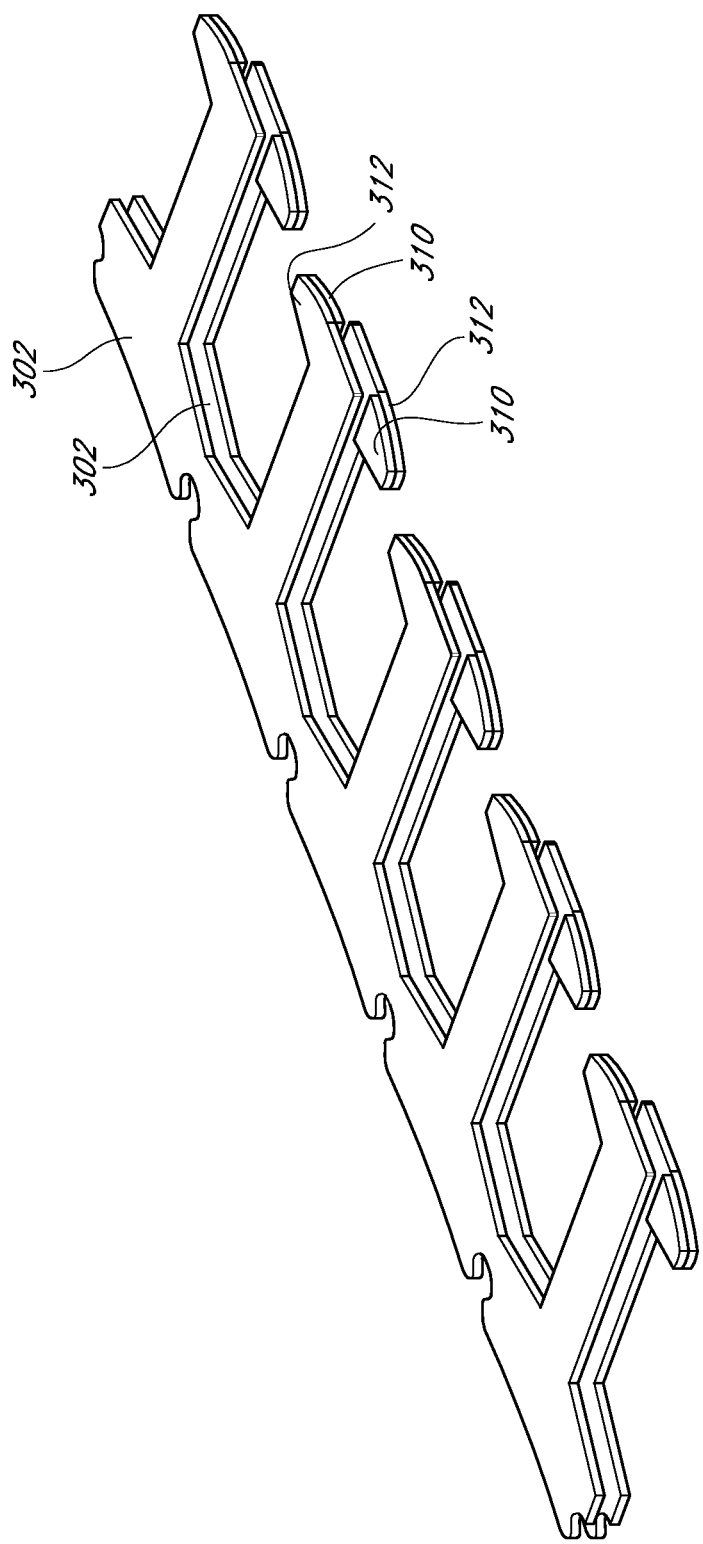
FIG. 16 is a perspective view of two core blanks being nested together.

In some configurations, the separate components described above can comprise small profile insert pieces formed from any suitable material. In some configurations, the insert pieces can be formed from a soft magnetic material. The configuration shown in FIG. 14, FIG. 15 and FIG. 16 fills the gaps with the integrated auxiliary portion 310. In any event, the auxiliary portions 310 can be used to fill at least a portion of the gap that otherwise might result from the asymmetrical pole extensions. Thus, at least one of the pole extensions PE preferably comprises the auxiliary portion 310.

The auxiliary portion 310 can be any portion of the strip 300 that normally would not be used in creating the core blanks 302 when forming more conventional lamination profiles for the stator 114. In other words, the auxiliary portion 310 preferably could be formed of a portion of the strip 300 that would normally be scrapped. Preferably, the auxiliary portion 310 substantially mirrors a main portion 312 of the pole tip 168 about a fold line f, which is indicated with a dashed line in FIG. 13 and shown in FIG. 15.

With reference to FIG. 15, the auxiliary portion 310 preferably can be folded over on top of the main portion 312 of the pole tip 168. While the configuration shown in FIG. 15 shows all of the auxiliary portions 310 being folded in the same direction relative to the main portion 312 (i.e., folded upwardly), it is possible to fold one or more of the auxiliary portions 310 under the main portion 312. Moreover, in some configurations, four core blanks 302 can be prepared in such a manner that no inversion is required for nesting (i.e., stacking with the auxiliary portions 310 alternating). Such configurations would improve assembly and manufacturing.

With reference again to FIG. 13, while only one auxiliary portion 310 is shown connected to the main portion 312 along a single bend line, it is possible for more than one auxiliary portion 310 to be used and for those auxiliary portions 310 to be connected to the main portion 312 along corresponding fold lines. Moreover, while the auxiliary portion 310 is shown positioned generally between the main portion 312 and the yoke 164 (i.e., inside of the pole tip 168), it is possible for the auxiliary portion 310 to be connected to any portion of the main portion 312. For example, the auxiliary portion 310 can be positioned with the main portion 312 positioned between the auxiliary portion 310 and the yoke 164 on the other strip 300 (i.e., outside of the pole tip 168). Moreover, the auxiliary portion 310 can be positioned with the main portion 312 positioned between the auxiliary portion 310 and the pole stem 167 (i.e., to the side of the pole tip 168). Positioning the auxiliary portion 310 inside of the pole tip 168 takes advantage of material that would otherwise be scrap in the manufacturing process. Positioning the auxiliary portion 310 outside of the pole tip 168 and positioning the auxiliary portion 310 to the side of the pole tip 168, while possible, are less desired because such positioning either reduces the pole stem width PSW or reduces the maximum pole tip width PTW. Nevertheless, such positioning can be used.

With reference again to FIG. 14, the core blanks 302 also can comprise a series of undercuts 304. Preferably, the undercuts 304 are spaced apart in a generally uniform manner along the length of the core blanks 302. The undercuts 304 define alignment and joining notches for the illustrated core blanks 302. In some configurations, the core blanks can be provided with other alignment and/or joining features, which could include protrusions, recesses or a combination of protrusions and recesses.

With reference to FIG. 13, the undercuts 304 can be as much as ⅔ of a width YW of the yoke 164 of the core blank 302 in the region of the undercut 304. In one configuration, the undercuts 304 can be about 90% of the width YW of the yoke 164. In some configurations, the undercut 304 can be omitted. In the illustrated configuration, the undercut 304 is generally C-shaped. The undercuts 304 can have any suitable profile. For example but without limitation, the undercuts 304 can be V-shaped, U-shaped, a straight cut with a rounded end or another other profile or combination of profiles that removes material and improves the ability of the core blanks 302 to bend around a former or to a patterned shape without substantial planar distortion. In some configurations, no undercuts are used but holes can be formed along the spine (see FIG. 17). Moreover, the depth of the undercuts 304 and/or the geometry of the undercuts 304 preferably is such as to allow flux transfer through the laminated member 160.

The stamped, generally flat core member 302 can be curved on edge. In some configurations, the stamped, generally flat core member 302 can be curved on edge into a continuous helix arranged with adjacent turns of steel touching. Preferably, the core member 302 is wound such that the poles 162 extend outward from the yoke 164. In some configurations, an insulated surface may be present between the adjacent turns. For example, if the strip 300 included a lightly insulated surface, then the insulated surface would be present between adjacent turns of the helix. The adjacent turns can be secured together in any suitable manner. For example but without limitation, in some applications, the adjacent turns can be riveted together. The layers of the lamination, whether defined by the turns of a helical stack or by individual profiles for each layer, or the parts of each layer, define a yoke following a closed path and a plurality of extending pole cores. In some embodiments the pole cores extend radially outward.

In some configurations, the lamination arrangements provide improved utilization of the stock lamination material by allowing poles of two profiles to be interleaved in the blank, which then form wider poles in the completed lamination stack after the profiles have been curved on edge and assembled together. This advantage is particularly applicable to machines having radially outwardly extending poles. In these machines, using the described lamination arrangements allows narrow slots between pole tips even though the spacing between the pole tips increases when the core member is curved on edge. This advantage may also apply in machines having radially inwardly extending poles, particularly where the pole length is low relative to the diameter of the yoke. In these cores, achieving narrow slots in the final lamination may be limited by the width of the pole stems. The described lamination arrangements would allow the slots to be narrow even where the pole stems are broad. These advantages are most apparent in electrical machines having broadly annular cores.

In some configurations, preparing the laminated motor stator stack (e.g., the magnetizable member 160) features at least two core blanks 302 that are helically wound together. Preferably, the two core blanks 302 each comprise asymmetrical pole tip profiles (i.e., the pole tips 168 feature asymmetrical pole extensions PE). The asymmetrical pole tip profiles generally comprise at least one auxiliary portion 310 and at least one main portion 312. In some configurations, the auxiliary portion 310 or portions and the main portion 312 are substantially the same shape (e.g., are mirror images separated by the fold line f) or are otherwise configured such that the asymmetrical pole extension PE is double layered prior to winding. In one configuration, the auxiliary portion 310 is positioned (e.g., folded) over the main portion 312 prior to winding and the auxiliary portion 310 generally matches the main portion 312. In some configurations, the auxiliary portion is posited over the main portion 312 prior to winding and the auxiliary portion 310 generally is shaped in a way that matches the differences in geometry from one lateral side of the pole tip to the other (e.g., will substantially mate with the shape of the pole tip gap). Thus, at least a portion of the pole extension PE portion of the pole tip 168 can be formed with a double thickness relative to another portion of the pole 162. In some configurations, the portion has a double thickness relative to at least the yoke 164.

Preferably, the auxiliary portion 310 is folded over the main portion 312 and the two mirror image core blanks 302 are stacked together prior to being wound into a spiral stack. In other methods, the core blanks may be interleaved as they are formed into the spiral stack with each profile being bent edgewise while separated from adjacent layers. In one configuration, every other layer of the pole tip 168 on opposing sides of the pole stem 167 is created by the auxiliary portion or portions 310. The number of layers used can be determined based upon the number of poles used and the flux transfer desired for the motor design. The overall thickness therefore may vary substantially but, in some forms the motor may have a thickness between about 8 mm and about 80 mm, between about 10 mm and about 60 mm or between about 12 mm and about 40 mm. The core blanks may be produced by stamping from webs of lamination material or by other cutting methods, such as water, plasma or laser cutting, for example but without limitation. Where the core blanks are for use in a helical core forming operation, the blanks may be cut from a continuous web of lamination moving progressively into the forming machine. The process of bending any included auxiliary portions may be conducted as the cut strip moves through the forming machine.

Figure 18:
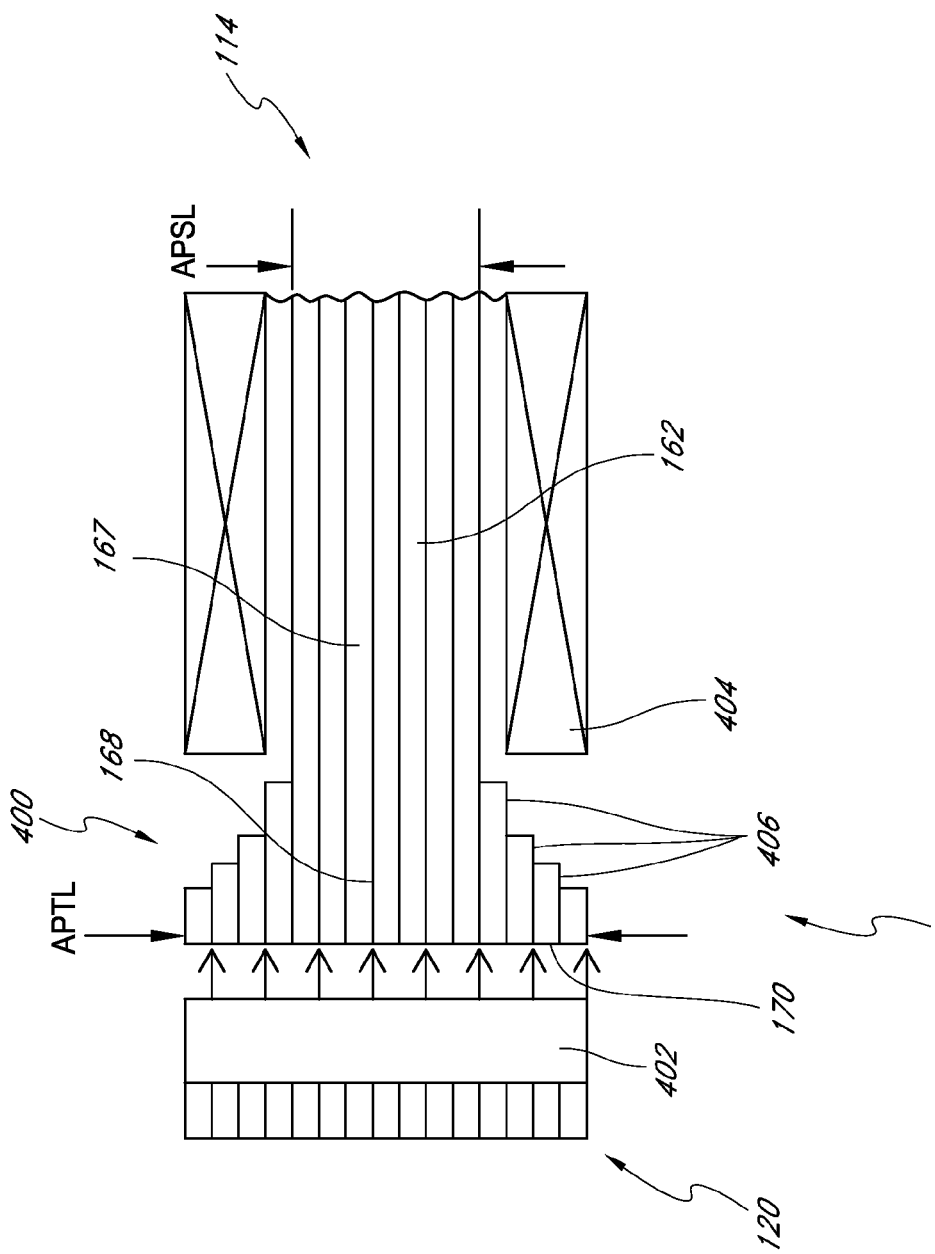
FIG. 18 is a simplified view of a stator having pole tips added to the ends of the poles.

With reference now to FIG. 18, a simplified axial cross-section of an outer end of the stator 114 is shown with an added pole tip construction 400 that is arranged and configured in accordance with certain features, aspects and advantages of the present invention. Typically, magnets 402 of the rotor 120 extend axially to overhang each end of the stator lamination. For example, with the magnetizable component 160 having an axial length of about 22 mm, the rotor magnets 402 may have an axial length of about 36 mm. The reason for the overhang is that the magnetic field from the ends of the magnets 402 couples into the stator 114 to increase the magnetic field coupling into the stator 114 relative to a magnet with no overhang. The height of the lamination stack of the stator 114, however, generally is determined by the portion of the stator 114 receiving windings 404 and a need to have the wound stator provide sufficient clearance for rotation of the rotor 120 relative to the stator 114 due to the inside-out configuration.

With reference to FIG. 18, the illustrated pole tip construction 400 increases the size of the profiled pole faces 170 to better take advantage of the increased length of the magnets 402. Through the use of the pole tip construction 400, the contribution of the magnet material at the axial ends of the magnets 402 is increased. Because the torque constant of the motor 112 is proportional to the magnitude of the magnetic flux coupling the stator coils 404 and the magnets 402, increasing the coupling increases the torque constant. In short, the magnetic flux coupling the stator coils 404 and the magnets 402 equals the product of the magnetic field intensity in the coils 404 and the cross-sectional area of the coils 404. Thus, the use of the pole tip construction 400 can increase the torque constant and/or can increase the efficiency relative to a construction of the same size not using the pole tip construction 400.

In some applications, such as those where minimizing overall motor axial length is desired, the pole tip construction 400 allows both the axial length of the magnets 402 and the axial length of the pole stem 167 (i.e., the lamination stack) to be reduced. In such applications, the axial lengths can be reduced until the motor using the pole tip construction 400 has a magnetic flux commensurate with the larger motor not using the pole tip construction, which results in both a thinner motor in the axial direction as well as reduced material costs.

With continued reference to FIG. 18, the pole tip construction 400 can comprise one or more additional layers 406 added to the regions of the pole tip 168 that are located generally outside of the windings 404 located on the pole stem 167. In other words, the pole tip construction 400 provides a laminated stator construction with a longer generally axial pole tip length APTL, more preferably at the pole face 170, relative to an axial pole stem length APSL. In some arrangements, the axial pole stem length APSL can be about 22 mm and the pole tip construction 400 can increase the axial pole tip length APTL by about 2-4 mm on both the top and the bottom of the pole tips 168.

The pole tip construction 400 can be formed of any suitable material. The additional layers 406 shown in FIG. 18, for example but without limitation, can be formed from electrical steel. In some configurations, the electrical steel can have a lightly insulated surface. In some configurations, the material is coated with an insulator on both surfaces of the sheet material to reduce the likelihood of electrical conductivity between adjacent layers.

The additional layers 406 can be formed in any suitable manner. For example, the additional layers 406 can be formed with any suitable folding technique. In some configurations, the additional layers can be fan folded, gator folded, or formed from a stack of shortened pieces, preferably retained from scrap resulting from the manufacture of the blanks 302. The additional layers 406 can be attached to the pole tip 168 in any suitable manner, including but not limited to, spot welding, laser welding, adhesive, overmolding, encapsulating, press locking arrangements or the like. Preferably, the adhesives are strong enough to hold the additional layers 406 to the pole tip during overmolding. More preferably, the adhesives are thermally resistant to temperatures encountered during overmolding.

In some configurations, the pole tip construction 400 increases the axial length of at least a central portion of the pole tip face 170 (i.e., the central portion of the pole tip face 170 can have an increased axial length relative to a construction without the pole tip construction 400). More preferably, the pole tip construction 400 generally matches the profile of the pole tip face 170, which can include the portions of the pole tip face 170 defined at the pole extensions PE (i.e., the portions of the pole tip face 170 that extend from the pole stem 167 to the pole tip ends 171).

As illustrated in FIG. 18, the pole tip construction 400 can taper such that the axial dimension (e.g., axial pole tip length APTL) decreases from the pole tip face 170 radially back toward the pole stem 167. In some configurations, the pole tip construction 400 tapers at about 30 degrees from an axis that extends through the center of the motor such that the coil 404 can be easily wound over one or more layers of the additional layers 406. In other configurations, the pole tip construction 400 can be formed of layers that substantially match the profile of the pole tips 168 when viewed in plan view. Such configurations, however, increase the material used and, therefore, increase the mass while not substantially increasing the flux coupling relative to the configuration shown in FIG. 18.

Figure 19:
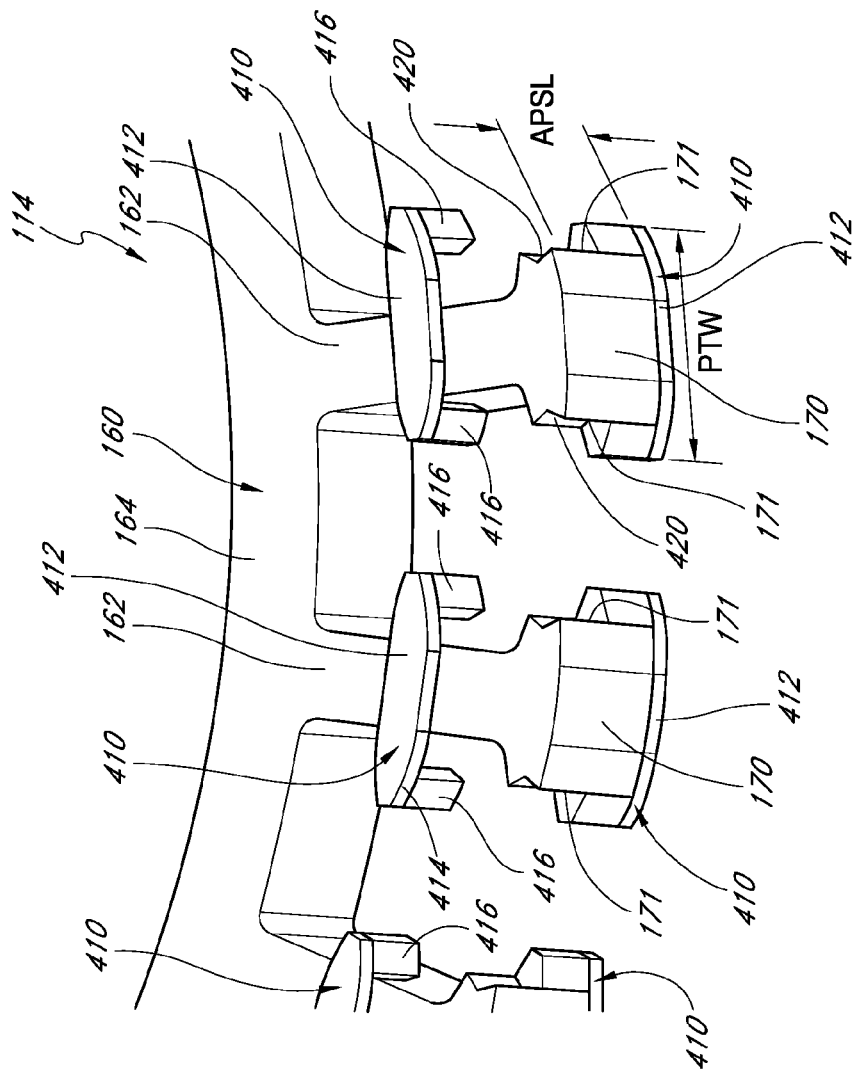
FIG. 19 is a perspective view of an extended pole tip assemblies being mounted to the stator.
Figure 20:
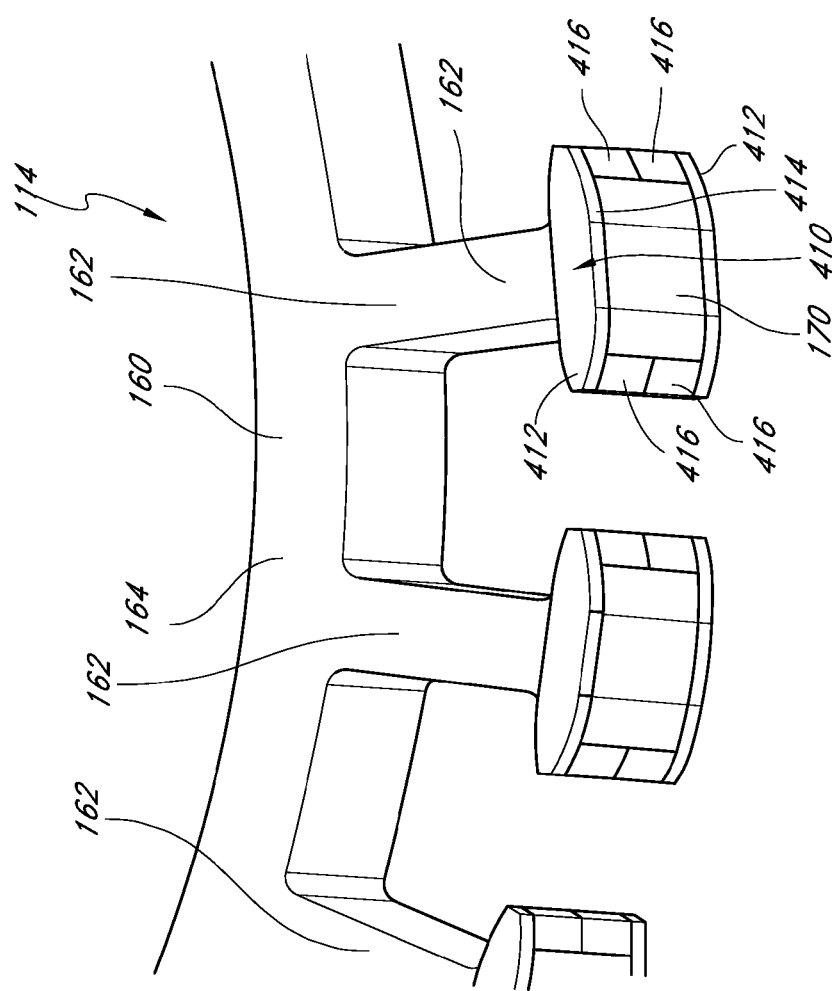
FIG. 20 is a perspective view of the extended pole tip assemblies mounted to the stator.

With reference now to FIGS. 19 and 20, another configuration of the pole tip construction 400 will be described in greater detail. While the configuration illustrated in FIG. 18 increases the axial pole tip length APTL, the configuration illustrated in FIGS. 19 and 20 increases at least the axial pole tip length APTL and the pole tip width PTW.

As illustrated in FIGS. 19 and 20, the pole tip construction 400 can comprise at least one frame member 410. The illustrated configuration comprises two frame members 410. The frame members 410 can have any suitable configuration. In some arrangements, the frame members 410 can be two identical members 410.

The frame members 410 can be made from any suitable material. For example but without limitation, the frame members 410 can be formed of metal. In some configurations, the metal frame members can have portions coated with non-conductive material, such as resin, or can be provided with surface conditioning, such as oxidation, to reduce or eliminate the likelihood of electrical eddy currents passing through the metal materials during use of the stator 114. In some configurations, the frame members 410 can be formed of highly metal filled polymeric materials. Preferably, the proportion of metal to polymer can be selected to suit the design goals of a particular configuration with respect to flux and mechanical strength. In some configurations, the frames are made from soft magnetic composites, such as those manufactured by Hoganas. Soft magnetic composites are pressed and heat-treated metal powder components with three-dimensional magnetic properties. The materials are composed of surface-insulated iron powder particles that are compacted to form uniform isotropic components with complex shapes in a single step. Preferably, the material used to form the frame members 410 allows polymer overmolding without significant thermal or chemical distortion.

With reference to FIG. 19, the illustrated frame member 410 comprises a main body 412. The main body 412 can be formed in any suitable manner. For example, the main body 412 can be a unitary structure, can be fan folded, gator folded, composed of discrete components or the like. The main body 412 preferably comprises an outer face 414. The outer face 414 can be generally contiguous with the pole tip face 170. In other words, the outer face 414 preferably forms a substantially uniform surface with the remainder of the pole tip face 170, which is defined by the member 160.

The main body 412 can have any suitable profile. In some embodiments, the main body 412, when viewed axially (i.e., in the axial direction of the stator 114) is substantially the same shape, when viewed axially, as a portion of the pole tip 168 that will abut the main body 412. In other embodiments, at least a portion of the main body 412 is substantially the same shape as a portion of the pole tip 168 that will abut the main body 412.

In the illustrated configuration, the frame member 410 also comprises at least one post 416. In the illustrated configuration, the frame member 410 comprises two posts 416. For example, in the illustrated configuration, the two posts 416 are sized to extend about one half of the axial pole base length such that, when two frame members 410 sandwich the pole tip 168 with a surface of each main body abutting a corresponding surface of the pole tip 168, the two posts 416 of one frame member 410 generally abut the two posts 416 of the other frame member 410. While the posts 416 need not abut, the abutting posts 416 advantageously reduce or eliminate gaps in the structure. In some configurations, each frame member 410 comprises a single post that extends substantially the full axial pole base length. Other configurations also are possible.

As shown in FIG. 19, a notch or engagement feature 420 can be formed at one or both pole tip ends 171. Preferably, the engagement feature 420 is formed at both pole tip ends 171. Moreover, while more than one shape of engagement feature 420 can be used, and while two different engagement features 420 can be used on a single pole 162, using a single engagement feature 420 simplifies manufacturing. Described above was a configuration using asymmetric pole extensions. In such configurations, the engagement feature can 420 be positioned in the extended pole extension such that, when inverted and nested, both ends of the pole tip 168 would include the engagement feature 420.

When combined, the two main bodies 412 and the corresponding posts 416 generally encircle the pole tips 168, including at least a portion of the pole tip ends 171. In the illustrated configuration, the pole tip construction 400 does not cover the pole tip face 170. It is possible, however, to extend the main bodies 412 to define a pole cap that generally engages the pole tip 168, including at least a portion of the pole tip face 170.

The engagement feature 420, while shown as a V-shaped notch in FIG. 19, can comprise any suitable configuration. For example but without limitation, the engagement feature 420 could comprise a groove formed by a profile with a half round, a V notch, a square profile, a rectangular profile or any other two dimensional profile where the shape of the surface formed by passing a profile of any shape other than a flat surface would produce a prism of that profile by the distance it is passed along a material. Thus, the negative engagement groove can be of any cross sectional shape that is convenient. In addition, the engagement feature 420 need not be a recessed or negative shape or series of shapes. Rather, the engagement structure 420 could be a ridge, a protrusion, or the like, having any suitable shape or series of shapes while the frame members 410 have a complementary shape or series of shapes.

Preferably, the frame members 410 and the pole tips 168 are configured such that the frame members can slide over the pole tips 168 into a final assembled position. The final assembled position preferably includes at least a portion of the frame members 410 abutting each other and the pole tips 168. Preferably, the frame members 410 and the pole tips 168 are secured against radial movement of the frame members 410 relative to the pole tips 168. In addition, the frame members 410 can be provided with some resistance to axial movement relative to the pole tips 168 such that the frame members 410 will remain in position until the overmolding discussed above has secured the frame members 410 in position relative to the pole tips 168.

Advantageously, compared to the additional layers 406 discussed above with respect to FIG. 18, the frame members 412 preferably extend the outer dimensions of the pole tips 168 in at least one dimension, preferably at least two dimensions and possibly all three dimensions. By engaging with the pole tip ends 171, the frame members 410 extend the outer dimensions of the pole tips 168 in at least two dimensions.

During assembly, the frame members 410 can be positioned on the pole tips 168 prior to overmolding of the magnetizable member 160. Any suitable technique can be used to maintain the frame members 410 in position during overmolding and, following overmolding, the overmolded structure will help to maintain the frame members in position.

As used herein, unless expressly stated to the contrary, "a generally symmetrical lamination stack for an electrical machine constructed from multiple stamped sheet metal profiles that are interleaved" should be construed to mean that the stack as a whole, when viewed in the axial direction. In other words, when viewed as a whole, the lamination stack is generally symmetrical while including components that may be generally asymmetrical when viewed alone.

Although the present invention has been described in terms of certain embodiments, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A generally symmetrical lamination stack for an electrical machine constructed from multiple stamped sheet metal profiles that are interleaved, the metal profiles comprising asymmetrical pole tip profiles, the asymmetrical pole tip profiles comprising a main pole extension on a first side of a pole body and a void on a second side of the pole body, the generally symmetrical lamination stack comprising a yoke forming a closed path and a plurality of pole cores extending radially from the yoke,
   wherein at least two of the multiple sheet metal profiles are not the same, and within each extending pole the form of adjacent sheet metal profiles are substantially different but in combination have a pole body and pole extensions either side of the pole body.

2. The generally symmetrical lamination stack for an electrical machine of claim 1, wherein the multiple stamped sheet metal profiles are interleaved in a helically wound spiral stack.

3. The generally symmetrical lamination stack for an electrical machine of claim 1, wherein the void on the second side of the pole body extends a full length of the main pole extension on the first side of the pole body such that an entire pole extension is omitted from the second side of the pole body.

4. The generally symmetrical lamination stack for an electrical machine of claim 1, wherein a first of the multiple stamped sheet metal profiles nests with a second of the multiple stamped sheet metal profiles to provide a generally symmetrical profile prior to winding.

5. The generally symmetrical lamination stack for an electrical machine of claim 1, wherein a pole body length is up to ten times a pole tip width in the assembled lamination stack.

6. The generally symmetrical lamination stack for an electrical machine of claim 1, the main pole extension being provided with a double thickness prior to helical winding.

7. The generally symmetrical lamination stack for an electrical machine of claim 6, wherein the double thickness main pole extension of a first pole supports the double thickness pole extension of a third pole and a second pole body being positioned between a pole body of the first pole and a pole body of the third pole.

8. The generally symmetrical lamination stack for an electrical machine of claim 1, wherein the asymmetrical pole tip profiles comprise an auxiliary portion also formed on the first side of the pole body.

9. The generally symmetrical lamination stack for an electrical machine of claim 8, wherein, prior to folding, the main pole extension and the auxiliary pole portion are connected at a fold line and, after folding, the main pole extension and the auxiliary pole portion combine to form a double thickness.

10. The generally symmetrical lamination stack for an electrical machine of claim 9, wherein the main pole extension, the auxiliary pole extension and the fold line are sized and configured to allow the positioning of the folded tip feature in a position with an edge surface of the auxiliary pole extension substantially aligned with the main pole extension after folding.

11. The generally symmetrical lamination stack for an electrical machine of claim 1, wherein the multiple sheet metal profiles comprise a spine undercut, and wherein the spine undercut has a depth that allows the flux transfer through the generally symmetrical lamination stack.

12. The generally symmetrical lamination stack for an electrical machine of claim 1, wherein each of the multiple sheet metal profiles comprises asymmetrical pole tip profiles comprising a first lateral profile at a first side of a tip region of a pole body and a second lateral profile at a second side of the tip region of the pole body, the first and second lateral profiles being dissimilar, such that the lateral profiles are not symmetric across a centerline of the pole body.

13. The generally symmetrical lamination stack for an electrical machine of claim 1 in combination with a rotor.

14. The generally symmetrical lamination stack for an electrical machine of claim 13 in combination with a washing machine drum, the rotor being connected for rotation with the washing machine drum.

15. A lamination stack for an electrical machine including a plurality of extending pole cores each including multiple layers of sheet metal, the stack constructed from multiple sheet metal profiles, wherein the sheet metal profiles each comprise asymmetrical pole tip profiles, the asymmetrical pole tip profiles each comprising a pole extension on a first side of a pole stem, and within the stack the asymmetrical pole tip profiles of the multiple sheet metal profiles combining so that each extending pole core has a pole stem and a pole extension either side of the pole stem when viewed in an axial direction of the stack, so that the stack is generally symmetrical when viewed in the axial direction.

16. The generally symmetrical lamination stack for an electrical machine of claim 15 in combination with a rotor.

17. The generally symmetrical lamination stack for an electrical machine of claim 16 in combination with a washing machine drum, the rotor being connected for rotation with the washing machine drum.

\* \* \* \* \*

UNITED STATES PATENT AND TRADEMARK OFFICE
CERTIFICATE OF CORRECTION

PATENT NO. : 9,634,529 B2
APPLICATION NO. : 13/693890
DATED : April 25, 2017
INVENTOR(S) : Hill et al.

Page 1 of 1

It is certified that error appears in the above-identified patent and that said Letters Patent is hereby corrected as shown below:

In Column 22 at Line 5, before "stack" insert --lamination--.

In Column 22 at Lines 14-15, after "extension" insert --on--.

In Column 22 at Line 16, before "stack," insert --lamination--.

In Column 22 at Line 16, before "stack" insert --lamination--.

Signed and Sealed this
Seventeenth Day of April, 2018

Andrei Iancu
*Director of the United States Patent and Trademark Office*